US009518861B2

(12) United States Patent
Aumente

(10) Patent No.: US 9,518,861 B2
(45) Date of Patent: Dec. 13, 2016

(54) LUGGAGE CONTROL AND VERIFICATION SYSTEM AND METHODS OF USE

(71) Applicant: Julio Aumente Aumente, Llucmajor (ES)

(72) Inventor: Julio Aumente Aumente, Llucmajor (ES)

( * ) Notice: Subject to any disclaimer, the term of this patent is extended or adjusted under 35 U.S.C. 154(b) by 49 days.

(21) Appl. No.: 14/505,093

(22) Filed: Oct. 2, 2014

(65) Prior Publication Data
US 2015/0096813 A1 Apr. 9, 2015

Related U.S. Application Data

(60) Provisional application No. 61/990,652, filed on May 8, 2014.

(30) Foreign Application Priority Data

Oct. 8, 2013 (ES) .................................. P201331478

(51) Int. Cl.
*G01G 19/52* (2006.01)
*G07B 15/00* (2011.01)
*B64F 1/36* (2006.01)

(52) U.S. Cl.
CPC ............... *G01G 19/52* (2013.01); *B64F 1/366* (2013.01); *G07B 15/00* (2013.01); *Y02T 50/82* (2013.01)

(58) Field of Classification Search
CPC ............ G01B 5/02; G01B 7/02; G01G 19/52; G01G 19/58; G07B 2017/00701; G07B 15/00; B64F 1/366; Y02T 50/82
See application file for complete search history.

(56) References Cited

U.S. PATENT DOCUMENTS

| 2,708,368 | A | * | 5/1955 | Kolisch | G06G 7/48 177/25.11 |
| 5,044,452 | A | * | 9/1991 | Rand | G01G 19/005 101/232 |
| 5,105,392 | A | * | 4/1992 | Stringer | G01B 11/002 367/99 |

(Continued)

FOREIGN PATENT DOCUMENTS

| GB | 2461949 A | * | 1/2010 | ........... G01G 19/414 |
| WO | 2012012841 A1 | | 2/2012 | |
| WO | 2012/130876 A1 | | 10/2012 | |

*Primary Examiner* — Randy W Gibson
(74) *Attorney, Agent, or Firm* — One3 IP Management, P.C.; Justin G. Sanders; Dean G. Stathakis

(57) ABSTRACT

A system for controlling and verifying the size and weight of a piece of carry-on luggage is disclosed. In at least one embodiment, an at least one database server is configured for selectively storing data related to at least one of the luggage, an at least one passenger in possession of the luggage, a transportation vehicle on which the passenger plans to travel, and a transportation hub from which the transportation vehicle is to depart. An at least one luggage device is in selective communication with the at least one database server and comprises a receptacle configured for removable receipt of the luggage—the receptacle formed having a bottom, a back wall, and an at least one side wall—and at least one verification device integral with the receptacle for determination of at least one of a height, depth, width, weight, and identification information associated with the luggage.

19 Claims, 11 Drawing Sheets

(56) References Cited

U.S. PATENT DOCUMENTS

| | | | | | |
|---|---|---|---|---|---|
| 5,266,810 | A | * | 11/1993 | Murphy | G01V 8/20 250/222.1 |
| 5,528,517 | A | * | 6/1996 | Loken | G01D 21/00 33/1 V |
| 5,777,746 | A | * | 7/1998 | Dlugos | G01B 11/02 177/25.15 |
| 5,841,541 | A | * | 11/1998 | Dlugos | G01G 19/005 177/1 |
| 5,878,379 | A | * | 3/1999 | Dlugos | G01B 21/00 367/99 |
| 6,044,353 | A | * | 3/2000 | Pugliese, III | G06Q 10/02 235/375 |
| 7,271,352 | B2 | * | 9/2007 | Rabindran | G01G 19/005 177/126 |
| 7,672,907 | B2 | * | 3/2010 | Morel | B41J 13/12 705/401 |
| 2002/0113715 | A1 | * | 8/2002 | Wilson | G01B 5/02 340/815.45 |
| 2004/0035928 | A1 | * | 2/2004 | Anderson | B64F 1/366 235/385 |
| 2010/0046152 | A1 | | 2/2010 | Ghobrial et al. | |
| 2012/0161975 | A1 | * | 6/2012 | Stewart | G01G 19/58 340/666 |
| 2013/0043079 | A1 | * | 2/2013 | Levin | G01G 19/58 177/1 |
| 2013/0211864 | A1 | * | 8/2013 | Sanderson | G06Q 10/02 705/5 |

* cited by examiner

LUGGAGE CONTROL AND VERIFICATION SYSTEM AND METHODS OF USE

RELATED APPLICATIONS

This application claims priority and is entitled to the filing date of U.S. provisional application Ser. No. 61/990,652—filed on May 8, 2014 and entitled "Luggage Control and Verification System and Method of Use"—and further claims priority and is entitled to the filing date of ES application number P201331478—filed on Oct. 8, 2013. The contents of the aforementioned applications are incorporated by reference herein.

BACKGROUND

Aspects of the present specification relate generally to control and verification systems and methods, and more particularly to systems and methods for control and verification of luggage.

Applicant(s) hereby incorporate herein by reference any and all patents and published patent applications cited or referred to in this application.

By way of background, the travel and tourism industry handles millions of passengers and their luggage annually all around the world. Due to the transportation companies' need for reducing or adjusting costs to the extent possible and/or to other safety and security concerns, passengers' luggage is often controlled in terms of certain maximum weight and dimension limitations it has to meet.

In the particular case of air transportation and airlines, there is typically a two-fold luggage control within the airport. The checked-in luggage weight is measured or verified by the airline crew during check-in and compared with that airline's weight limits for checked-in luggage. Whereas, the hand/carry-on luggage is controlled at the boarding gate often in a random, permissive, and tolerant manner. Such variance is most often a byproduct of current hand-luggage controls varying across or even within a particular airline or transportation company from mere visual inspection to the insertion of the hand luggage inside a container or frame configured for the maximum allowed luggage dimensions, whereby if the luggage does not fit therein the passenger is not allowed to take the luggage on-board the airplane, but must instead check the hand luggage, potentially causing delays and frustration for both the passenger and the transportation company staff. Alternatively, a passenger may simply "force" his or her luggage into the test container so as to "pass" and board with the luggage, potentially then having issues with the luggage once on board.

Moreover, oftentimes the hand baggage weight is not even verified, since that would imply or likely result in a slowdown in the boarding process, which the airlines would like to avoid. In other transportation sectors, such as train transport, luggage weight and dimensions are often not controlled, even if there are restrictions concerning these two factors. As such, there is typically not even provided a means for measuring the weight of carry-on bags at the boarding gate, allowing passengers to "stuff" such bags prior to boarding and often then exceed what would otherwise be acceptable weight limits. In the aggregate, such weight overages can have a very real and even dramatic effect on the airlines, both in terms of safety and operational cost (i.e., fuel consumption). Accordingly, it has even been proposed within the airline industry that the passengers themselves would be weighed and additional fees charged for exceeding particular weight limits.

Further, once any such data is collected for one or more pieces of luggage or carry-on bags for a particular transportation vehicle being boarded, it would be beneficial to have the ability to aggregate and organize such data for purposes of analyzing, verifying and managing such carry-on luggage, both as part of the boarding process and in connection with further decisions and procedures relating to departure.

The present specification addresses the shortcomings of known approaches to luggage control and verification that have been previously attempted or implemented. The present specification thus discloses a system and method for controlling and verifying passenger luggage, including but not limited to, overcoming the above-mentioned inconveniences regarding control of the weight and dimensions of each piece of luggage, the lack of accurate dimension control resources, the variation in allowed weight and dimensions among transportation companies, the performance of any such control and verification being manual and thus more time-consuming and prone to error, and the absence of any effective way to aggregate and make use of passenger and luggage data in real-time.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a system for controlling and verifying the size and weight of an at least one piece of carry-on luggage. In at least one embodiment, an at least one database server is configured for selectively storing data related to at least one of the luggage, an at least one passenger in possession of the luggage, a transportation vehicle on which the passenger plans to travel, and a transportation hub from which the transportation vehicle is to depart. An at least one luggage device is in selective communication with the at least one database server and comprises a receptacle configured for removable receipt of the luggage, the receptacle formed having a bottom, a back wall, and an at least one side wall, and at least one verification device integral with the receptacle for determination of at least one of a height, depth, width, weight, and identification information associated with the luggage. Upon the creation of a new departure involving the transportation vehicle, the luggage device is configured for obtaining select information related to the departure, the information including at least one of a maximum luggage weight for the transportation vehicle, a current luggage weight, a maximum luggage size for the transportation vehicle, a maximum luggage count for the transportation vehicle, a current luggage count, a maximum storage volume for the transportation vehicle, and a currently occupied volume. Upon the passenger subsequently utilizing the luggage device to verify the size and weight of the luggage, the luggage device is further configured for receiving the luggage within the receptacle of the luggage device and determining the weight and dimensions of the luggage. Upon determining that the weight of the luggage is greater than the maximum luggage weight, the luggage device generates an overweight penalty fee that the passenger must pay. Similarly, upon determining that the dimensions of the luggage are greater than the maximum luggage size, the luggage device generates an oversized penalty fee that the passenger must pay.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

The present specification relates generally to a luggage control and verification system and method of use. While the exemplary context is hand or "carry-on" luggage such as in the air transportation context, or any such item that a passenger carries on board with them rather than "checking" the item so as to be "boarded" by airline personnel, it will be appreciated that the invention is not so limited but may instead be employed in a variety of other contexts. Accordingly, it is to be expressly understood that the terms "luggage" or "bag" as used throughout may be any item or object that is to be verified. In the exemplary embodiments for the illustrated hand luggage context, aspects of the system and method are directed to determining or controlling both the weight and size or dimensions of the luggage, as by comparing such measurements obtained by the system with the allowable weight and dimensions established by the transportation company. Such measurement and comparison functions may be performed automatically or semi-automatically as enabled by the system and its related hardware and software or firmware. In further aspects, the process and the resulting verification information is shown on a display of the system, such as any cost associated with an overweight or oversize bag, and may be further communicated through a print-out, before or after an optional payment step. In particular, in a further aspect, the system may be equipped for Internet access and payment processing, such that a voucher or receipt may be generated and presented to a transportation company representative as evidence of the verification of the hand luggage and payment of any oversize fees prior to boarding. Once again, those skilled in the art will appreciate that a variety of other contexts and related systems and methods may be employed according to aspects of the present invention, in various combinations, without departing from the spirit and scope of the invention, such that those exemplary embodiments shown and described herein are to be understood as merely illustrative of aspects and features of the present invention and expressly non-limiting.

Figure 1:
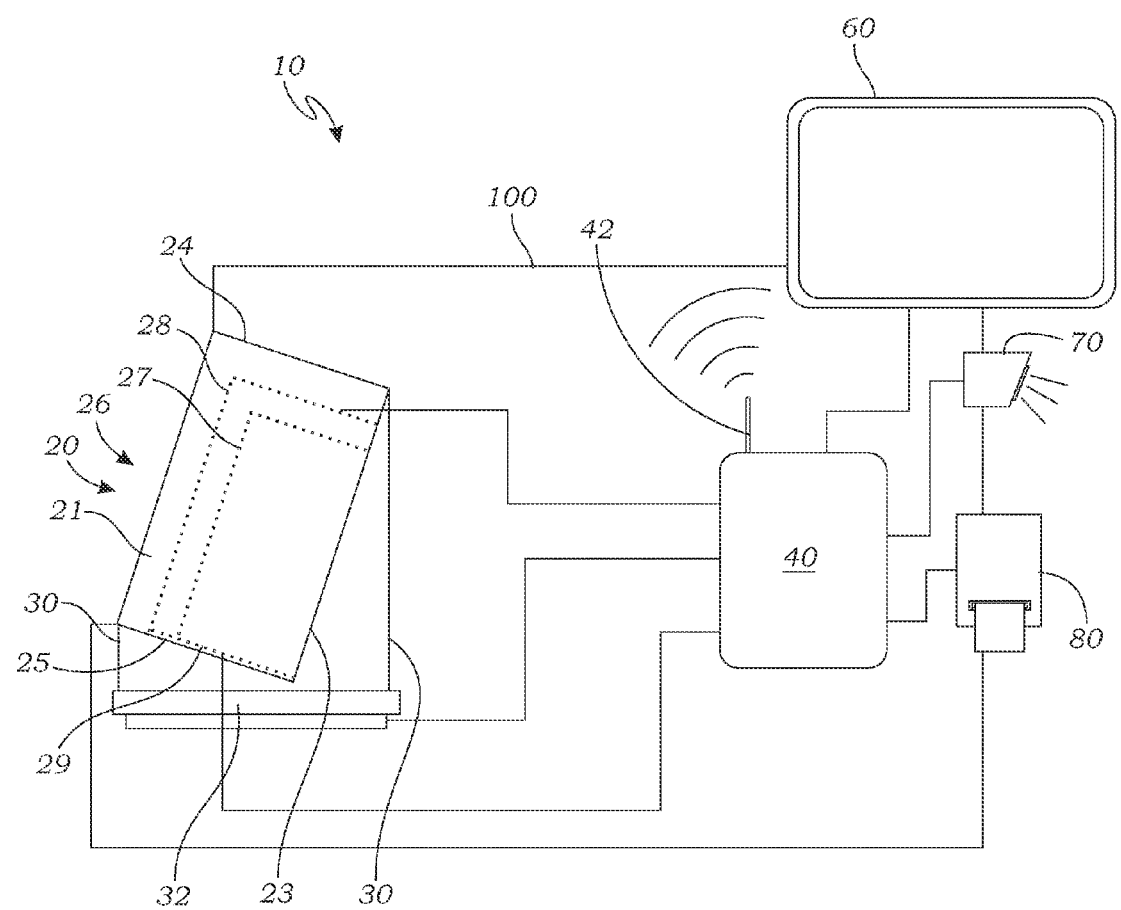
FIG. 1 illustrates a schematic diagram of an exemplary luggage control and verification system, in accordance with at least one embodiment.

Referring now to FIG. 1, there is shown a schematic diagram of an exemplary luggage control and verification device (hereinafter also referred to simply as a "luggage device") 10, in accordance with at least one embodiment. The device 10 generally comprises a luggage receptacle 20, a computerized processing unit 40, and a display device 60, in the exemplary embodiment all substantially self-contained within a housing 100. Optionally, the device 10 may be further configured with a barcode or QR code scanner 70 or the like for reading a passenger's ticket or boarding pass so as to associate the luggage L to be verified, and a printer 80 for printing a ticket, voucher, receipt or the like after the verification and any related payment process is completed. Further optionally, the device may not include the display device or at least any user interface or interactivity such that the device performs all of its functions as herein described automatically, including reporting compliance of a carry-on bag or assessing a surcharge for a non-compliant bag based on payment information already on file in connection with the passenger with whom the bag is associated. It will be appreciated that all such variations are encompassed within the scope of the invention.

Regarding the luggage receptacle 20, as shown in FIG. 1 schematically, also referred to as a basket, cavity or platform, it may be configured generally as a box installed within and open to the exterior of the housing 100, having two opposite sides 21, 22 (FIG. 3), a back 23, a top 24, and a bottom 25, the sides, top and bottom defining an opening 26 in the housing 100 through which the receptacle 20 is accessed as when a piece of luggage L (FIG. 7) is inserted or removed. It will be appreciated that the receptacle 20 is sized and configured for accommodating not only properly dimensioned carry-on luggage L but luggage L exceeding the maximum allowed dimension as well, both to allow for measurement of and payment for oversized bags but to generally allow for the relatively easy insertion and removal of luggage L from the device's receptacle 20 within at least a range of sizes, versus the receptacle being sized only as a net-fit for bags within the allowed size range, which for one can vary among transportation companies and could lead to passenger frustration and/or damage to the device 10 and luggage L is potentially forced in and out of the receptacle 20. As further depicted in FIG. 1, in the exemplary embodiment the receptacle 20 is pitched slightly back so as to encourage any bags placed therein to slide rearwardly and rest against the back 23 of the receptacle 20, thereby fixing a reference point for dimensional measurement. It will be appreciated that the degree of the pitch or the angle of receptacle 20 relative to the housing 100 or to vertical can vary depending on a number of factors, including but not limited to form factors for the overall device 10 and the material of which particularly the bottom 25 of the receptacle is formed (i.e., the material's surface friction or characteristics). The receptacle 20 is thus configured with one or more substantially parallel rows of sensors in at least the sides 21, 22 and bottom 25 of the receptacle 20 positioned for "looking across" the receptacle 20 and thus determining the dimensions of the luggage L placed therein. In the illustrated embodiment, there are two parallel or offset "tracks" of sensors 27, 28 in each side 21, 22 configured in somewhat of an inverted "L" pattern for locating and thus measuring effectively the depth of the luggage L, or the dimension of the luggage L from the receptacle back 23 toward the receptacle front or opening 26 and the height of the luggage L from the bottom 25 of the receptacle 20 on which the luggage L is sitting toward the top 24. Similarly, one or more tracks of sensors 29 in the bottom 25 of the receptacle 20 may be employed in "looking up" toward the top 24 so as to determine the width or side-to-side dimension of the luggage L. It will be appreciated that a variety of additional locations and patterns of the sensors may be employed beyond those shown and described without departing from the spirit and scope of the invention; for example, the sensors 29 for measuring width can just as easily be positioned in the top 24 of the receptacle 20. Moreover, those skilled in the art will appreciate that a series of fixed position sensors may be employed along the "tracks" represented by the dotted lines in FIG. 1 thereby effectively forming one or more sensor arrays, or one or more adjustable position sensors may be installed and mechanically operated in such a way as to traverse the depicted track in "scanning" the luggage L. Preferably the sensors 27-29 would be positioned within or behind the side, bottom, or top walls of the receptacle 20 so as to prevent tampering with or disabling the sensors or damage to the sensors as luggage L goes in and out of the receptacle 20. The sensors may include, but are not limited to, infrared barriers, image sensors (camera+shape recognition algorithms), ultrasound sensors, etc., and the device 10 can employ a single measurement sensor/method or a combination of them. Any such sensors and means of mounting and operating whether in a fixed or adjustable array for the purpose of determining the dimensions of a piece of luggage L or other object placed within any such receptacle 20, whether now known or later developed, may be employed without departing from the spirit and scope of the present invention. Any or all such sensors would together comprise more generally a verification device installed within the receptacle 20.

According to aspects of the present invention, in one embodiment, a luggage control and verification device 10 disclosed herein comprises a single sensor. In another embodiment, a luggage control and verification device 10 disclosed herein comprises a plurality of sensors. In other aspects of the invention, a luggage control and verification device 10 disclosed herein comprises, e.g., one sensor, two sensors, three sensors, four sensors, five sensors, six sensors, seven sensors, eight sensors, nine sensors, or ten sensors. In other aspects of the invention, a luggage control and verification device 10 disclosed herein comprises, e.g., at least one sensor, at least two sensors, at least three sensors, at least four sensors, at least five sensors, at least six sensors, at least seven sensors, at least eight sensors, at least nine sensors, or at least ten sensors. In yet other aspects of the invention, a luggage control and verification device 10 disclosed herein comprises, e.g., at most one sensor, at most two sensors, at most three sensors, at most four sensors, at most five sensors, at most six sensors, at most seven sensors, at most eight sensors, at most nine sensors, or at most ten sensors.

In still other aspects of the invention, a luggage control and verification device 10 disclosed herein comprises, e.g., about 1 to about 2 sensors, about 1 to about 3 sensors, about 1 to about 4 sensors, about 1 to about 5 sensors, about 1 to about 6 sensors, about 1 to about 7 sensors, about 1 to about 8 sensors, about 1 to about 9 sensors, about 1 to about 10 sensors, about 2 to about 3 sensors, about 2 to about 4 sensors, about 2 to about 5 sensors, about 2 to about 6 sensors, about 2 to about 7 sensors, about 2 to about 8 sensors, about 2 to about 9 sensors, about 2 to about 10 sensors, about 3 to about 4 sensors, about 3 to about 5 sensors, about 3 to about 6 sensors, about 3 to about 7 sensors, about 3 to about 8 sensors, about 3 to about 9 sensors, about 3 to about 10 sensors, about 4 to about 5 sensors, about 4 to about 6 sensors, about 4 to about 7 sensors, about 4 to about 8 sensors, about 4 to about 9 sensors, about 4 to about 10 sensors, about 5 to about 6 sensors, about 5 to about 7 sensors, about 5 to about 8 sensors, about 5 to about 9 sensors, about 5 to about 10 sensors, about 6 to about 7 sensors, about 6 to about 8 sensors, about 6 to about 9 sensors, about 6 to about 10 sensors, about 7 to about 8 sensors, about 7 to about 9 sensors, about 7 to about 10 sensors, about 8 to about 9 sensors, about 8 to about 10 sensors, or about 9 to about 10 sensors. In still further embodiments, the device 10 may incorporate any other number of sensors.

In still other aspects of the invention, a luggage control and verification device 10 disclosed herein comprises, e.g., at least one laser, at least one laser rangefinder, at least linear encoder, at least one linear variable differential transformer, at least one photoelectric sensor, at least one photosensor, at least on photodetector, at least one photocell, at least one photoresistor, at least one light-dependent resistor, at least one position sensor, at least one variable reluctance sensor, at least one contact image sensor, at least one charge coupled device, at least one electro-optical sensor, at least one infrared sensor, at least one position sensitive device, at least one position sensitive detector, at least one optical position sensor, or at least one ultrasound sensor.

In still other aspects of the invention, a luggage control and verification device 10 disclosed herein comprises a sensor having a sensitivity of, e.g., up to about 0.01 inch, up to about 0.02 inch, up to about 0.03 inch, up to about 0.04 inch, up to about 0.05 inch, up to about 0.06 inch, up to about 0.07 inch, up to about 0.08 inch, up to about 0.09 inch, up to about 0.1 inch, up to about 0.2 inch, up to about 0.3 inch, up to about 0.4 inch, up to about 0.5 inch, up to about 0.6 inch, up to about 0.7 inch, up to about 0.8 inch, up to about 0.9 inch, up to about 1 inch, up to about 2 inches, up to about 3 inches, up to about 4 inches, or up to about 5 inches. In still further embodiments, the at least one sensor of the device 10 may have any other sensitivity range, now known or later developed.

With continued reference to FIG. 1 and the receptacle 20, there it is shown schematically that in the exemplary embodiment the pitched receptacle 20 may be supported or installed on a frame 30 or other such vertical wall system and that such frame 30 is then positioned or mounted on a scale 32 for the purpose of weighing any piece of luggage L (FIG. 7) or other item placed within the receptacle 20 of the luggage control and verification device 10 according to aspects of the present invention. As shown, both the scale 32 and the side and bottom sensors 27-29 are electrically connected to the processing unit 40 of the control and verification device 10, with the scale 32 thus comprising a further verification device integral with the receptacle 20. Particularly, it is noted that an electrical wire is shown as connecting only the second track of side sensors 28 and the bottom sensors 29 with the processing unit 40 in FIG. 1, while the first track of side sensors 27 along with the bottom sensors 29 are shown connected to the processing unit 40 in FIG. 2; it is to be understood that any such connections are merely illustrative and that each individual sensor could be connected back to the processing unit or all sensors may be ganged or passed through a circuit board or terminal strip in the vicinity of the receptacle 20 and from there the individual sensor signals or data transmitted to the processing unit 40 on a single wire. It will be appreciated that any such configuration of the connections of the sensors to the processing unit 40 may be employed in the present invention. The processing unit 40 may be an on-board and integrated computing system or device that is configured with software or firmware to operate (send signals and data to and from) other components of the system, both in acquiring and acting on data (as through the scale 32 and sensors 27-29 and the barcode scanner 70) and then in reporting to or interacting with a user based on any and all such data (as through the display device 60 and any printer(s) 80 incorporated in the system), more about which is said below, or in other embodiments the processing unit 40 may effectively be an external computing system or device, such as a PC or the like, configured with the appropriate software or firmware to operate the device 10, communicating therewith via any wired or wireless network or means now known or later developed. It will be appreciated that the scale 32 would thus be configured as by a tare setting, calibration, or otherwise to not account for the weight of the receptacle 20 and support frame 30 themselves, so as to only determine or reflect the weight of the actual piece of luggage L or other item placed within the receptacle 20, which data intake and processing may be handled by the processing unit 40 in cooperation with the scale 32. Similarly, the processing unit 40 in cooperation with the sensors 27-29 is capable of acquiring any relevant image or measurement data and then manipulating it so as to determine height, depth, and width of the bag, whether in actual dimensions or within a range, either numerical or more akin to a "go/no-go" determination. In either case, the determined dimensions and weight may be compared to allowable ranges or maximums stored in the processing unit 40 or accessed by the processing unit 40 for the purpose of then verifying whether the luggage L is compliant relative to such required specifications and, if not, what non-compliant or oversize fee may be assessed, again, pursuant to rules and regulations imposed by the particular transportation company, all according to software or firmware installed or residing in the processing unit 40. Any such determinations may be communicated to the user/traveler via the display device 60 of the device 10, which may, for example, take the form of a touchscreen or tactile interface also in communication with the processing unit 40. It will be appreciated, though, that any user interface and related display device now known or later developed can be employed. In at least one further embodiment, the device 10 may email the results of the luggage L verification to the passenger. As explained in more detail below in connection with the alternative exemplary embodiments of FIGS. 4-8, the device 10 may also be equipped with various means for accepting and processing payment of fees. In at least one embodiment, once any such bag has been determined compliant or a non-compliant bag has been paid for, the device 10 may then generate a receipt, voucher, ticket, or the like as evidence that the hand or carry-on luggage L is approved for boarding via the printer 80 in conjunction once more with the processing unit 40, or via email in at least one embodiment. Again, any such devices for generating a hard copy or even digital copy of such baggage verification, now known or later developed, may be employed according to aspects of the present invention without departing from its spirit and scope.

According to further aspects of the present invention, in one embodiment, a luggage control and verification device 10 disclosed herein comprises, e.g., a spring scale, a balance scale, a pendulum balance scale, a hydraulic scale, a pneumatic scale, a digital scale, or a strain gauge scale.

According to further aspects of the present invention, in one embodiment, a luggage control and verification device 10 disclosed herein comprises a scale having a sensitivity of, e.g., up to about 0.01 pound, up to about 0.02 pound, up to about 0.03 pound, up to about 0.04 pound, up to about 0.05 pound, up to about 0.06 pound, up to about 0.07 pound, up to about 0.08 pound, up to about 0.09 pound, up to about 0.1 pound, up to about 0.2 pound, up to about 0.3 pound, up to about 0.4 pound, up to about 0.5 pound, up to about 0.6 pound, up to about 0.7 pound, up to about 0.8 pound, up to about 0.9 pound, up to about 1 pound, up to about 2 pounds, up to about 3 pounds, up to about 4 pounds, or up to about 5 pounds. In still further embodiments, the at least one scale of the device 10 may have any other sensitivity range, now known or later developed.

As noted previously, the processing unit 40 may store data regarding the hand bag or carry-on luggage L limitations or restrictions imposed by the transportation company, which may be uploaded to the device 10 in any suitable manner. One such exemplary means of data upload may be simply vie pre-programming the device 10 with such data either during manufacture or installation in the field, such programming potentially being by way of an interface port for data exchange such as USB or RS-232 or by an installer having the ability to enter or modify such data directly through the display device 60 if configured as a touchscreen or other such user interface. Another exemplary means for data exchange with the processing unit 40 is wirelessly, as by equipping the processing unit 40 with a transceiver 42 as depicted in FIG. 1, whereby communications with the device 10 over the Internet or via any other communication protocol now known or later developed may take place, including but not limited to GSM or GPRS connectivity. Accordingly, luggage L size and weight limitations may be varied from time to time as seen fit by the transportation company, whether based on changes to corresponding regulations or even from flight to flight depending on factors such as the type of aircraft and how full the flight is expected to be. As such, "real time" restrictions on baggage can even be made, subject again more generally to the transportation company's policies and procedures and contractual obligations to its passengers concerning their ticketed travel or fares paid. In the same way, "real time" data such as flight logs or ticketed passenger manifests can be communicated to the control and verification device 10 via the transceiver 42 of the processing unit 40 based, for example, initially on all ticketed passengers (those that bought a seat) and ultimately on the passengers that have checked in and received boarding passes. Thus, as passengers arrive at the gate after having presumably checked in, received a boarding pass, and come through security, they can then verify the compliance of their carry-on luggage L at the gate while they await or during boarding. With the passenger manifest or other such information already stored in the device's processing unit 40 as sent over the Internet or otherwise, a passenger may approach the device 10 and commence luggage L verification by following the prompts on and/or interacting with the display device 60. Their particular passenger information with which their carry-on bag is to be associated may be accessed or pulled up by user entries, such as through configuration of the display device 60 as a touchscreen user interface with which the passenger interacts, or by the passenger simply scanning their boarding pass via the barcode scanner 70. Then, when the bag is determined to be compliant or the fee for a non-compliant bag is paid, the issued receipt, ticket, or voucher would properly link to or list the same identifying information associated with the passenger and his or her boarding pass for presentation to the gate attendant during boarding. Generally, the control and verification device 10 according to aspects of the present invention is in at least one exemplary embodiment equipped with software or firmware installed in the computer system or processing unit 40, which then performs or governs essentially the entire verification process, including communication with the sensors 27-29 and scale 32 for determining baggage size and weight, other components enabling operation of the device 10 such as the touchscreen or other display device 60, the barcode or other such scanner 70, and the ticket printer 80, and even communications with external servers and data sources via, for example, a wireless communication transceiver 42 incorporated within or otherwise operably connected to the processing unit 40. Such wireless communications may also be employed in conducting maintenance of the device 10, installing software upgrades, updating datasets regarding luggage L compliance, and the like, whether from a transportation company or an owner or operator or other support/service provider. Once more, various other components and forms of connection and interaction now known or later developed are also possible without departing from the spirit and scope of the present invention.

Figure 2:
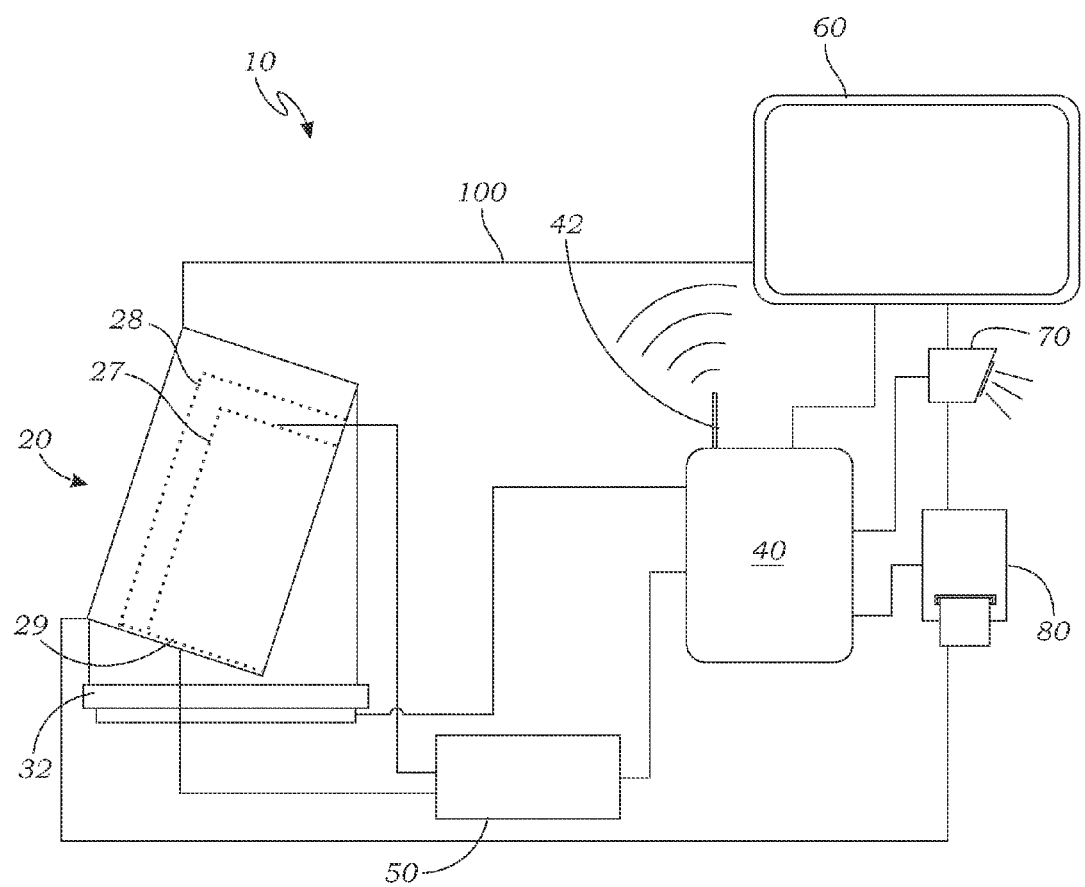
FIG. 2 illustrates a schematic diagram of an alternative exemplary luggage control and verification system, in accordance with at least one embodiment.

Turning briefly to FIG. 2, there is shown a schematic of an alternative exemplary embodiment luggage control and verification device 10 according to aspects of the present invention. Essentially, the device 10 is much like that depicted in FIG. 1 as described in detail above, except that there is further provided an intermediate control unit 50 shown as being electrically connected between the sensors 27-29 and the processing unit 40. As such, the control unit 50 could, for example, function to gather the data from the sensors, translate it to a "go/no-go" signal regarding luggage L compliance/non-compliance, and send this result to the computer processing unit 40. In this way, the control unit 50 acts like a "smart" integrated circuit or terminal strip for the sensors 27-29 as alluded to above regarding the various ways the sensors, individually or collectively, can ultimately be connected or wired to the processing unit 40. It is further noted that while the scale 32 is shown as still being wired directly to the processing unit 40 as in FIG. 1, it is equally possible that the scale 32 could also be wired through the intermediate control unit 50 for a go/no-go determination as to the weight of the luggage L in much the same way that the sensor data is aggregated and reported to the processing unit 40 in this alternative embodiment. It will be appreciated by those skilled in the art that to whatever extent the control unit 50 serves as a "go/no-go" gauge for the device 10 it will need to be configured or programmed with the appropriate algorithm and/or tolerances for the size and weight measurements to then be applied, which information in the exemplary embodiment would be acquired by and stored in the processing unit 40 as described herein and then relayed to the control unit 50, for example, along the same connection or wire that the data is sent from the control unit 50 to the processing unit 40.

Figure 3:
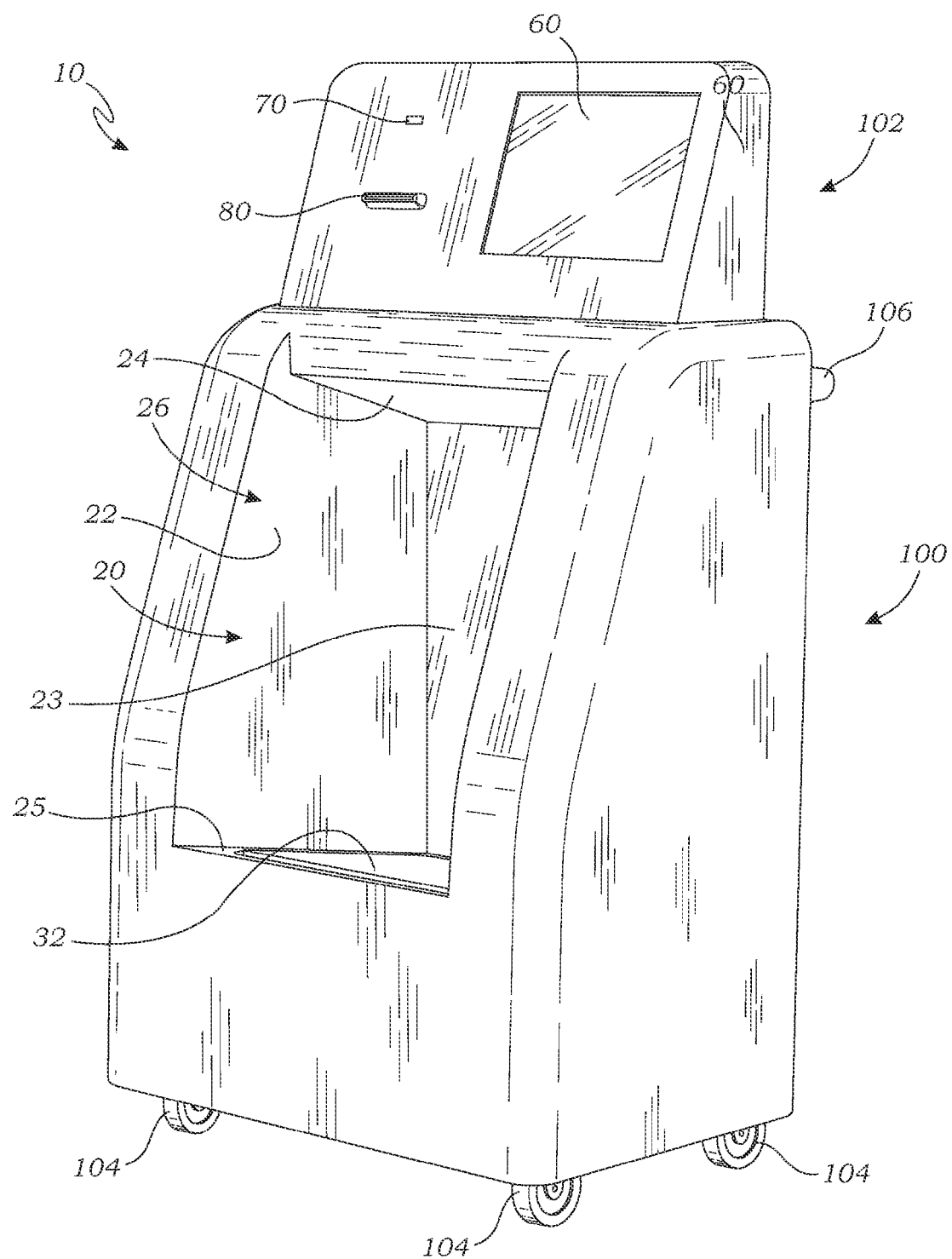
FIG. 3 illustrates a perspective view of an exemplary luggage control and verification system as illustrated in FIG. 1 or 2, in accordance with at least one embodiment.

Referring now to the perspective view of FIG. 3, there is shown an exemplary luggage control and verification device 10 according to aspects of the present invention as depicted schematically in FIGS. 1 and 2. The device 10 again includes a housing 100 having formed therein a receptacle 20 having a left side 22, a back 23, a top 24, and a bottom 25 and so defining an opening 26 within which a piece of luggage L (FIG. 7) may be placed. As depicted, the receptacle 20 is here formed in its bottom 25 with the scale 32 exposed therein for the luggage L to rest directly on versus the entire receptacle 20 effectively resting on the scale 32 as in FIGS. 1 and 2. It will be appreciated that either way the weight of the carry-on bag or the like may be determined once placed within the receptacle 20. Sensors in the walls of the receptacle 20, not shown here as being hidden therein, are again configured to detect the size of the bag or other item placed within the receptacle 20 and relay that information to the processing unit 40 (FIGS. 1 and 2) as above-described. Notably, the device 10 is shown as being further configured with a section of the housing 100 above the receptacle generally defining a user interface portion 102 of the device 10. In the exemplary embodiment shown, the user interface portion 102 contains the display device 60, once again configured as a touchscreen or the like, the scanner 70, which here is shown as a small opening in which the reader or other device is positioned, and the printer 80, here simply showing the dispenser portion from which a receipt, ticket, voucher, or the like would be dispensed during use. As shown, the device's housing 100 may also be configured with wheels 104 and a handle 106 for transport and mobility. More generally, it will be appreciated that the exemplary device 10 is self-contained, relatively compact, transportable, and easy to install in a reduced space. The result is the possibility of installing a group of such devices 10 all together in order to maximize the passenger flow during boarding and hence minimize the boarding time, particularly when passengers are verifying their carry-on bags during boarding rather than prior to boarding. The devices 10 can also be moved from gate to gate by airport or airline personnel demanding on demand, thereby allowing for greater capacity or use with the same number of devices on hand.

Figure 4:
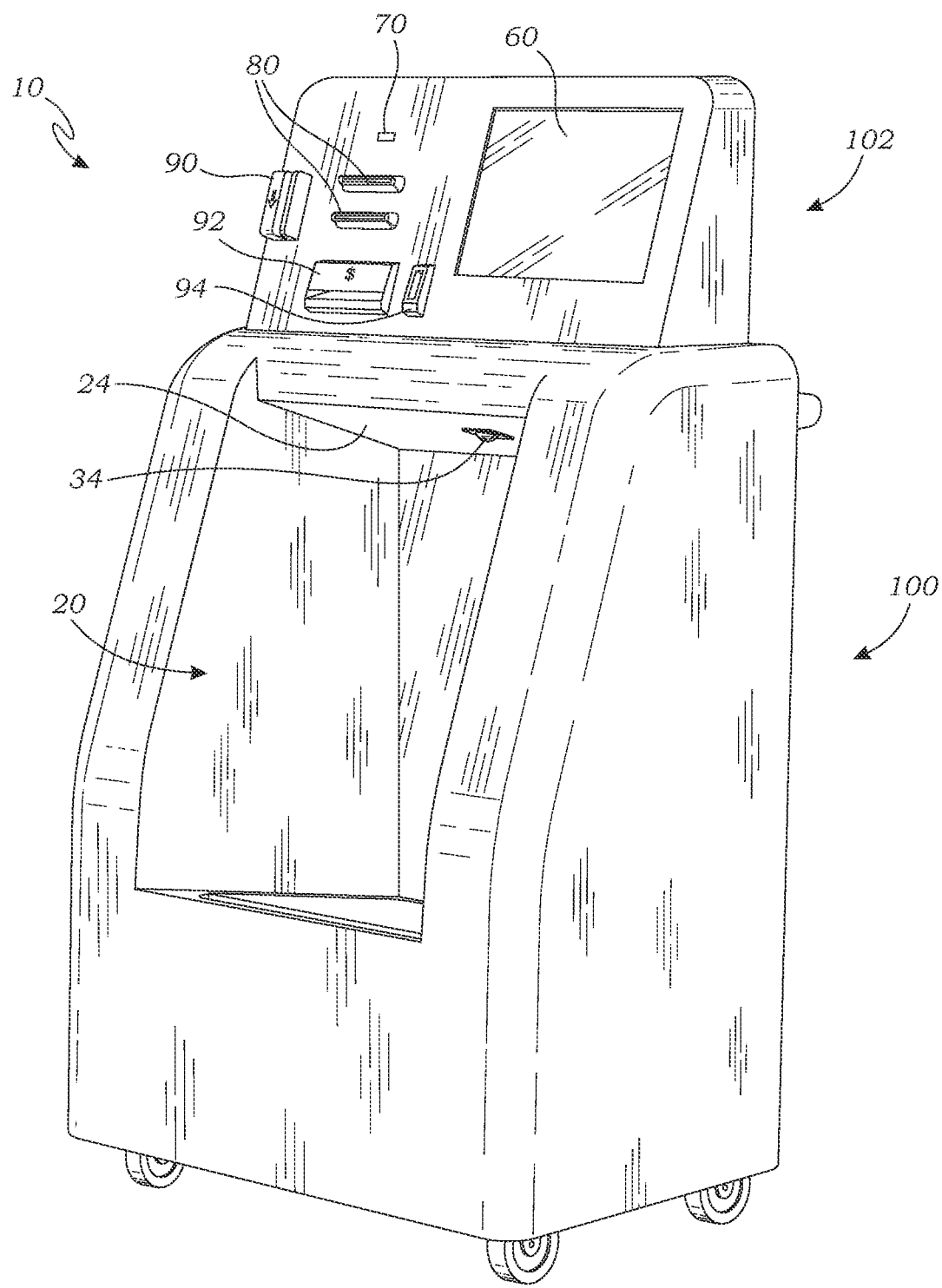
FIG. 4 illustrates a perspective view of an alternative exemplary luggage control and verification system, in accordance with at least one embodiment.

In FIG. 4 there is shown a perspective view of an alternative exemplary luggage control and verification device 10 much like that shown in FIG. 3 for simplicity. However, with regard to the user interface portion 102 of the device's cabinet or housing 100, there are now shown various means or devices for accepting payment: specifically, there is shown a card reader 90 for credit card payment, a bill slot 92 for payment by cash or notes, and a coin slot 94 for payment by accepted coins or tokens. Of course, the machine itself through signage (not shown) and/or its display device 60 will specify the forms of payment that are accepted. It will be appreciated that any such method of payment now known or later developed may be implemented without departing from the spirit and scope of the invention. Regarding payment, it is further contemplated that whether there are payment devices provided as in FIG. 4 or not as in the embodiment of FIG. 3, payment can be completely handled through the display device 60 as by prompting the user to authorize a charge of any oversize fees to the same credit card used to purchase the airline tickets or other travel itself and already of record with the transportation company. It will be appreciated that this would be convenient for the passenger and would further expedite carry-on baggage verification prior to boarding. Relatedly, those skilled in the art will appreciate that any credit card processing, whether by swiping a plastic card through the card reader 90 or by authorizing such a charge through user selections via the display device 60 or other buttons or input devices (not shown), the device 10 preferably is capable of being on-line as through an established Internet connection via the transceiver 42 of the processing unit 40 (FIGS. 1, 2 and 6). Once more, regarding payment, the display device 60 or screen will indicate to the passenger once his or her bag is verified what, if anything, is owed and then will be able to prompt the passenger through the payment process in a manner known in the art as in other kiosks, vending machines, and the like. Furthermore, in the alternative embodiment there are now shown two printers 80: a first for printing the receipt, ticket, or voucher as herein described that may then be presented to the gate agent or other airport or airline personnel to allow boarding with the carry-on item; and a second for printing a barcode sticker or the like to place on the carry-on luggage L for purposes of identification and further visual evidence of compliance, whether again based on coming in below the maximum allowances for size and weight or based on payment of non-compliance fees to render the bag allowable as a carry-on versus being checked. With continued reference to FIG. 4 and with further reference to the enlarged lower perspective view of FIG. 5 effectively looking more upwardly at the top 24 of the receptacle 20, there is shown in the alternative embodiment an at least one camera 34 installed in the top 24 whereby a photograph of the top of the luggage L or other item being verified can be taken during the measurement operation, simply for further visual evidence of the bag for later verification as needed. It will be appreciated that the top of a bag or other container most often has any identifying tags or the like, which would then be photographed as part of the verification when the bag is placed in the receptacle 20. Such photo may then be saved and archived as part of the verification record for the bag. It will be appreciated that the ceiling camera 34 is one more reason to provide sufficient clearance around the bag, particularly between the upper end of the bag and the top 24 of the receptacle 20 (FIG. 7). Depending on the camera and the lens selected, the at least one camera 34 may also be capable of providing some or all of the actual dimensional inspection of the luggage L; for example, the camera may be able to have a wide enough angle lens to "see" the entire top of the bag and so document the width and depth of the bag, and may be further capable based on focal length or the like of determining the distance from the camera to the top of the bag and thus, knowing the overall height of the receptacle 20, which is essentially a fixed dimension, the height of the bag may thus also be determined. As such, one or more properly configured and positioned cameras 34 may alone be capable of making all required dimensional determinations. As such, the camera 34 in some embodiments may be used instead of or in addition to any sensors and so may further comprise a verification device installed within the receptacle 20. Those skilled in the art will appreciate that the camera 34 may be configured in any suitable manner and installed in any suitable location without departing from the spirit and scope of the invention, such that the depiction and location of the camera 34 in the figures is to be expressly understood as illustrative of features and aspects of the invention and non-limiting. In a still further embodiment, a second camera (not shown) may be positioned and configured for taking a photograph of the passenger for still further visual evidence of the owner of the bag, such photograph also capable of being saved and archived as part of the verification record for the bag. In a still further embodiment, the camera 34 is positioned and configured for taking a photograph of both the passenger and the top of the bag. In another embodiment, the device 10 incorporates a fingerprint scanner (not shown) configured for capturing the passenger's fingerprint for still further evidence of the owner of the bag, such fingerprint scan also capable of being saved and archived as part of the verification record for the bag.

Figure 5:
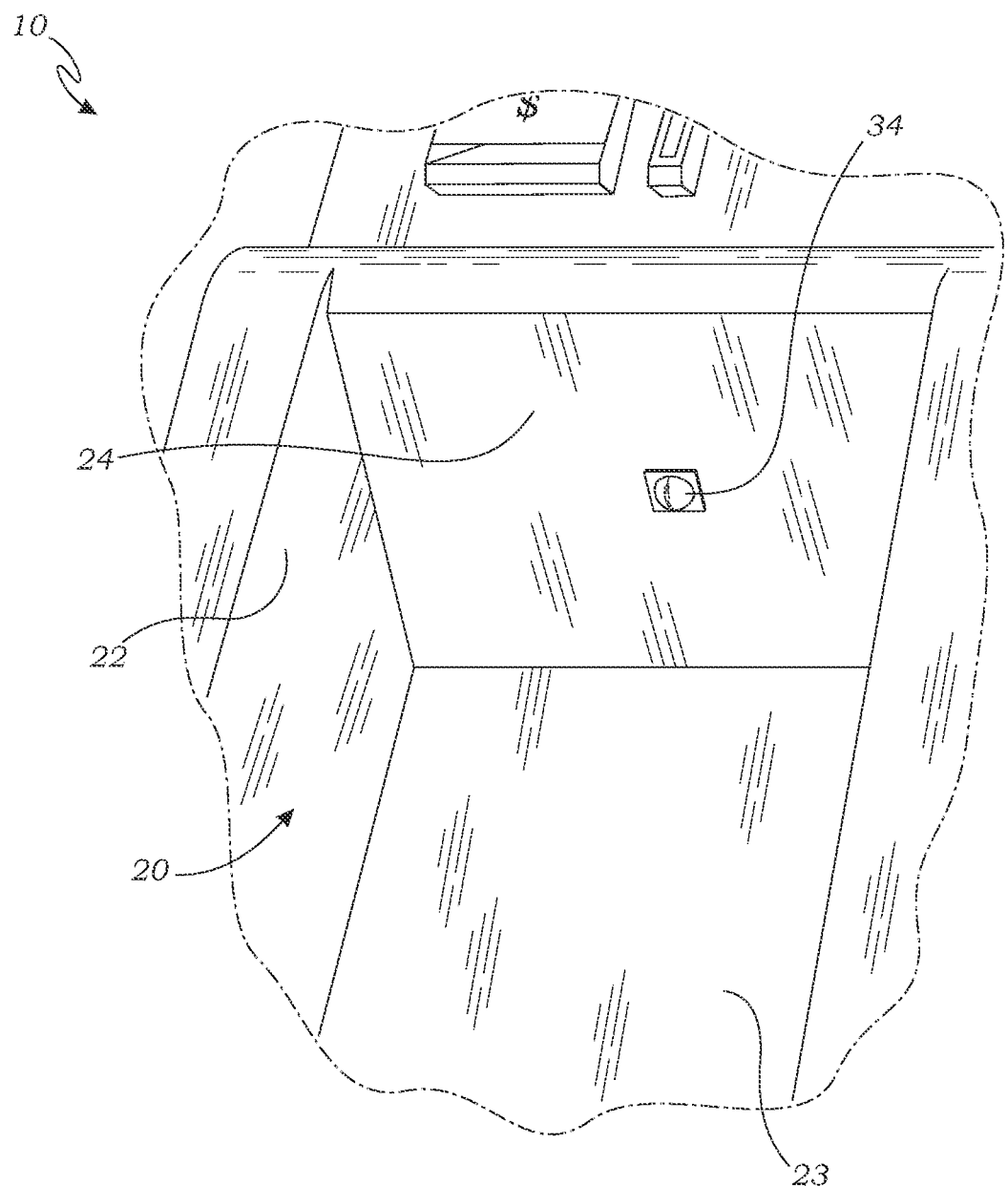
FIG. 5 illustrates an enlarged partial perspective view of the alternative exemplary luggage control and verification system illustrated in FIG. 4, taken from a slightly lower vantage point, in accordance with at least one embodiment.
Figure 6:
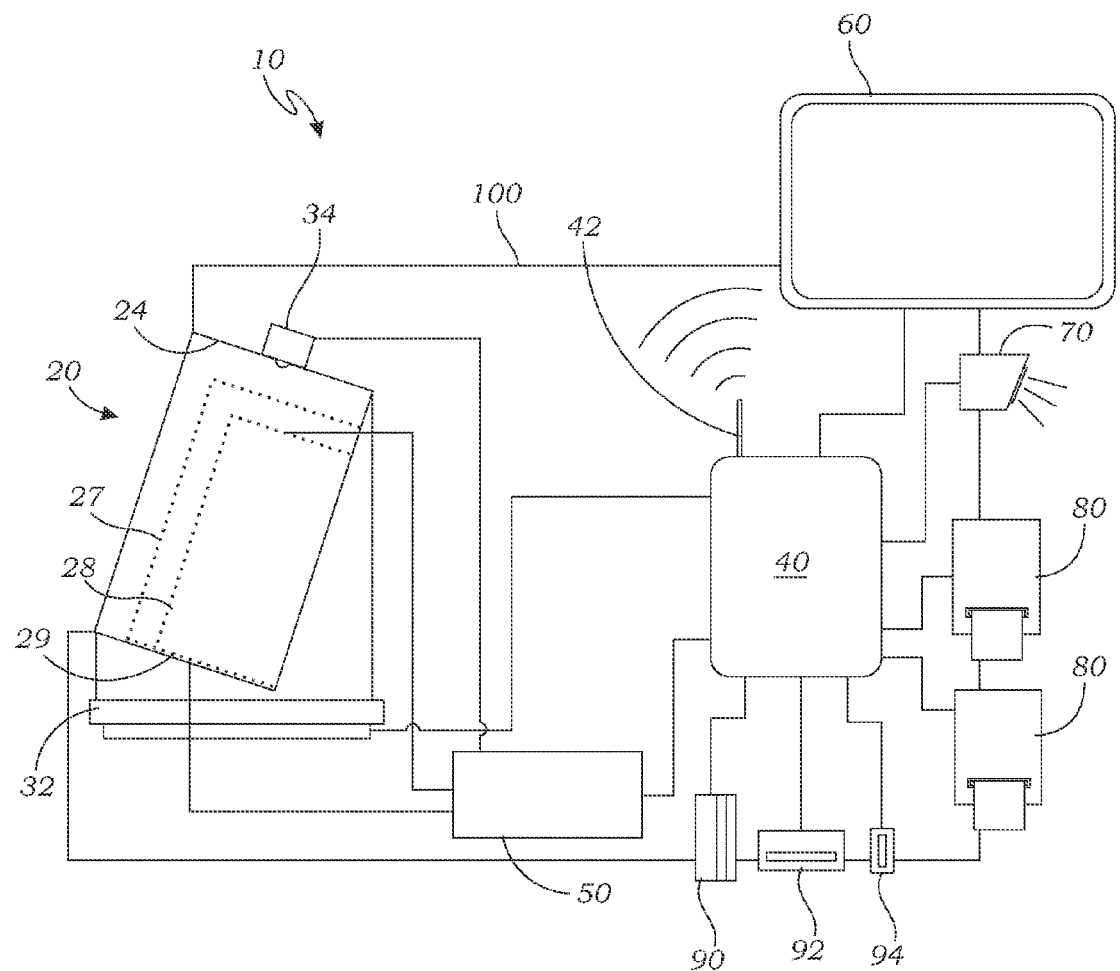
FIG. 6 illustrates a schematic diagram of the exemplary luggage control and verification system as illustrated in FIGS. 4 and 5, in accordance with at least one embodiment.
Figure 7:
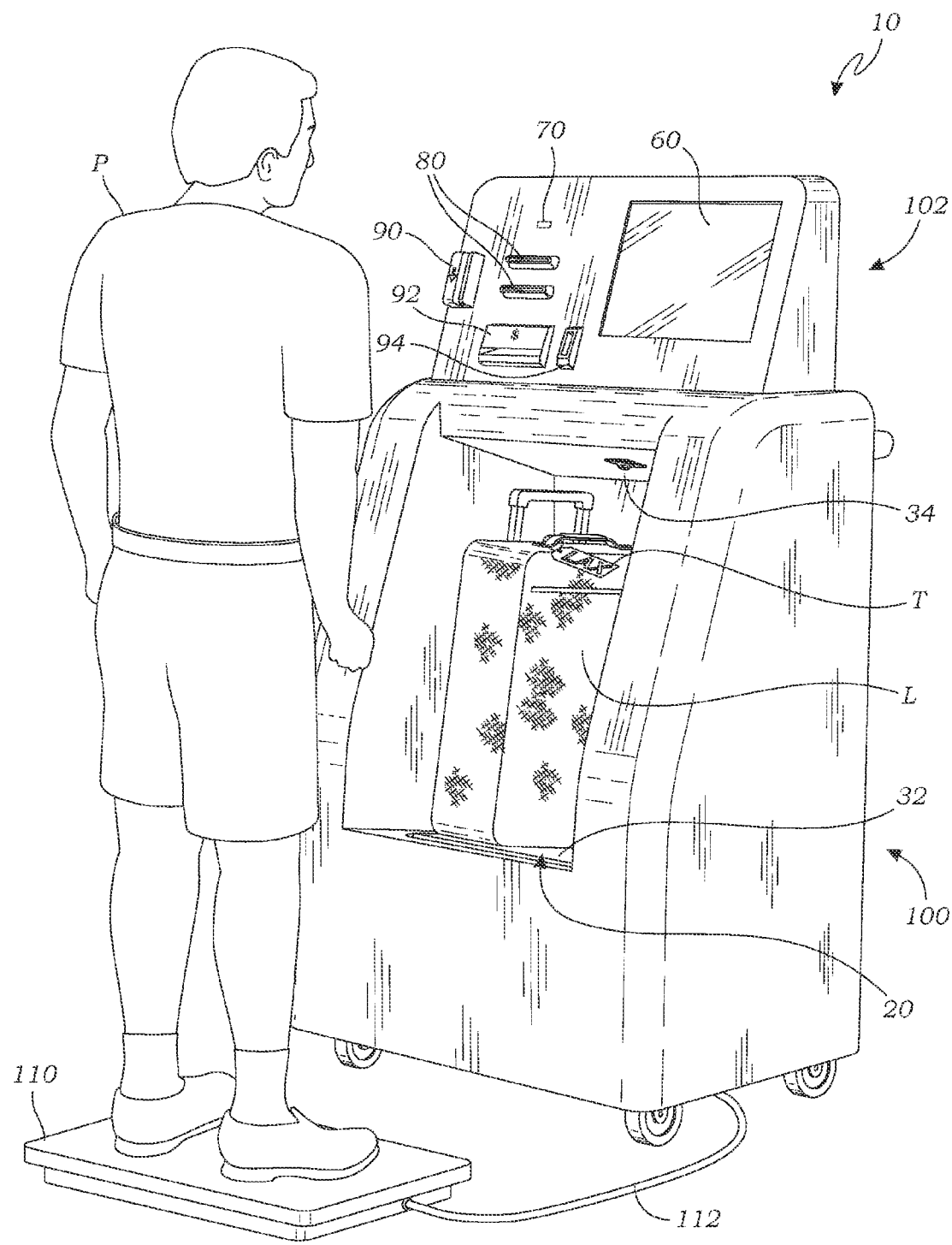
FIG. 7 illustrates a perspective view of a further alternative exemplary luggage control and verification system, in accordance with at least one embodiment.
Figure 8:
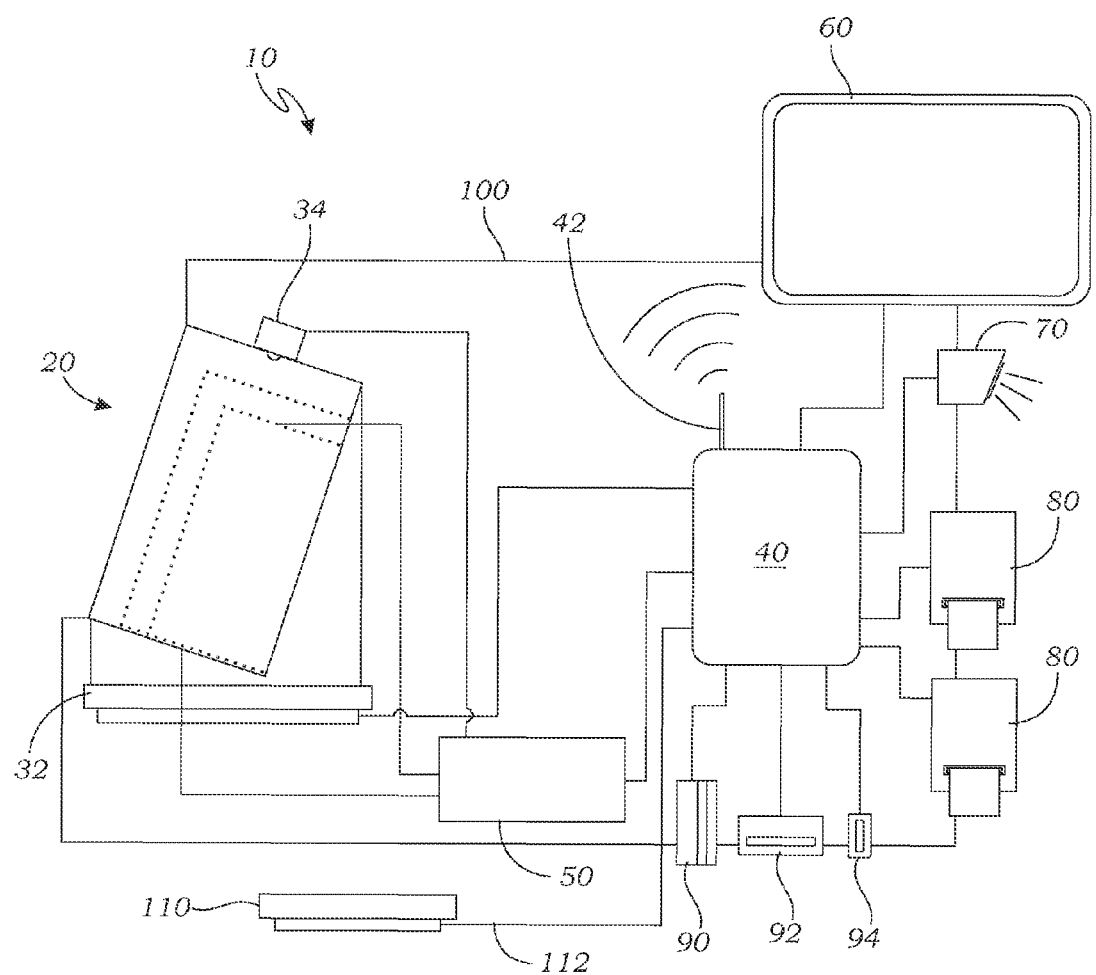
FIG. 8 illustrates a schematic diagram of the exemplary luggage control and verification system as illustrated in FIG. 7, in accordance with at least one embodiment.

Turning next to FIG. 6, there is shown a schematic diagram of the alternative embodiment of the luggage control and verification device 10 shown in FIGS. 4 and 5 analogous to the schematics of FIGS. 1 and 2 relative to the embodiment of the device of FIG. 3. As shown in FIG. 6, the control unit 50 is again employed in conjunction with the processing unit 40 in compiling and acting on at least the dimensional data gathered by the sensors 27-29. Moreover, here, the camera 34 positioned in or adjacent to the top 24 of the receptacle 20 is also shown as being connected through the control unit 50, as when the camera data is also employed in verification. In alternative embodiments and uses of the camera 34 it may instead be wired directly to the processing unit 40 so as to be controlled in connection with image acquisition of a subject bag for identification as part of the verification record, such record thus including identification information for the bag or other item as obtained from the camera 34. The scale 32 is once again shown as also connected directly to the processing unit 40, but as explained above it also could be wired through the control unit 50 as part of its function as an initial "go/no-go" data analysis step. As also depicted in FIG. 6, the payment means or devices—namely, the card reader 90, the bill slot 92, and the coin slot 94—are shown as being formed and accessible in the housing 100 and connected to the processing unit 40 directly, under which control the payment devices then operate in a manner known in the art. Finally, the two printers 80 are also depicted, the function of which in the exemplary embodiment are described above in connection with FIG. 4. It will once again be appreciated by those skilled in the art that a variety of other components and configurations beyond those shown in FIGS. 4-6 in connection with the alternative embodiment are possible without departing from the spirit and scope of the present invention.

Referring now to FIG. 7, there is shown a perspective view of still another alternative exemplary embodiment of a luggage control and verification device 10 according to aspects of the present invention substantially like the embodiment of FIGS. 4-6, with one exception discussed further below. As shown, a passenger P may approach the device 10 and place his carry-on luggage L within the receptacle 20. Before or after doing so, the passenger P may be prompted to scan his boarding pass using the integrated scanner 70 so as to identify the passenger and associate the bag L to be verified with him. Scanning the boarding pass or other such user selections made on the display device 60 or otherwise, as prompted, will commence the luggage L verification process, as by scanning the luggage L to determine its physical size and weighing the luggage L on the scale 32 within the receptacle 20. Again, the luggage L may optionally be photographed via camera 34, whether for identification only or as part of the screening algorithm. As shown, an exemplary tag T attached at the top of the bag L would be captured in such photo as well. Once more, the determined size and weight values for the luggage L are then compared by the processing unit 40 (FIGS. 1, 2 and 6) to the allowable limits established by the transportation company or other authority and stored therein. An appropriate message is then displayed on the display device 60 for the passenger P to see and react to as needed; particularly, if the bag L is oversized in any respect and oversize fees are owed, the passenger P is again prompted regarding the payment requirement and options, which may then be handled as set forth elsewhere herein. Meanwhile, as also shown in the alternative embodiment of FIG. 7 and the related schematic view of FIG. 8, when the user approaches the device 10, he may step up on a separately provided external scale 110, which may be connected to the device 10 via a cable 112. In this way, as the passenger P is interacting with the device 10 via the various aspects of the user interface portion 102, the passenger's weight may also be obtained by the external scale 110. Though not yet a common industry practice, it has been proposed that passengers' weights may also be accounted for in ticketing or any surcharges being assessed for overweight travelers. While this may not sound kind or "politically correct," there is a practical, direct impact of weight on fuel consumption, which of course has already led to strict rules on the weight of baggage, so it logically and reasonably follows that fares may also be linked to travelers' weight. Accordingly, aspects of the present invention provide a device 10 having a means for also measuring a passenger's weight at the time of boarding, in which case any overage can be detected and any related surcharge or fee assessed at that time in much the same way as for luggage L. And as with luggage L and acceptable maximums for size and weight, acceptable or industry adopted "norms" for passenger weight may be provided to or otherwise stored in the processing unit 40 (FIGS. 1, 2 and 6) of the device 10. Any such information regarding a passenger P and his luggage L (e.g., passenger information, luggage L information, luggage L verification results, and non-compliance fees) may be processed confidentially and either stored in or transmitted from the device 10 after boarding has completed, whether via secure transmission over the Internet for "real time" or dynamic payment processing, or on the hard drive (not shown) of the processing unit 40 instead, in which case after the boarding process this information can be extracted (for example, with or to a USB external hard drive) by the airline crew and sent to the airline to process the charges and payments in batch form using their infrastructure. With continued reference to FIG. 7, once more, upon completion of all appropriate verifications of both the passenger (e.g., identity as through the boarding pass, weight, etc.) and any associated luggage L (size and weight), appropriate receipts can be generated and dispensed via one of the printers 80 provided as part of the user interface portion 102 of the device 10, such as at least indicating the passenger data, luggage L weight and dimensional compliance data, and data relating to fees and charges, all for the passenger's reference and records. There is further optionally employed a second printer 80 for generating and dispensing a barcode sticker to be affixed to the verified luggage L, all under the control of the processing unit 40 (FIGS. 1, 2, 6, and 8).

Figure 9:
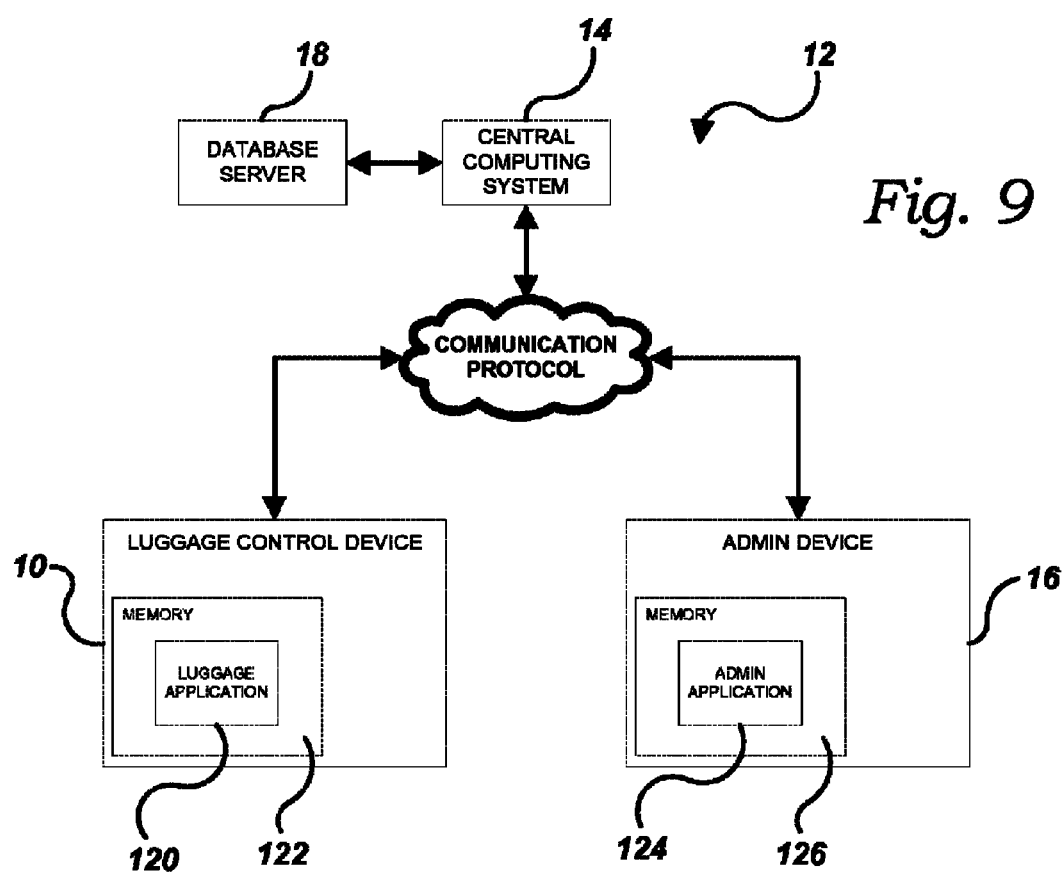
FIG. 9 is a simplified schematic view of an exemplary system for analyzing, verifying and managing luggage, in accordance with at least one embodiment.

Turning now to the simplified schematic view of FIG. 9, in at least one embodiment, the luggage device 10 is implemented in a larger system 12 for analyzing, verifying and managing luggage L. In at least one such embodiment, in addition to at least one luggage device 10, the system provides a central computing system 14 in selective communication with the at least one luggage device 10 and configured for receiving and processing at least one of luggage-related data, passenger-related data, travel-related data, and departure-related data. The system 12 further provides, in at least one embodiment, an at least one admin device 16 in selective communication with the computing system 14. In at least one embodiment, as discussed further below, the at least one admin device 16 is also in selective communication with the at least one luggage device 10. Additionally, in at least one embodiment, an at least one database server 18 is in communication with the computing system 14 and configured for selectively storing said luggage-related data, passenger-related data, and travel-related data. In at least one embodiment, the computing system 14 and database server 18 are one and the same. In at least one embodiment, the computing system 14 and database server 18 are omitted, such that the system 12 and associated methods described herein are implemented solely through the at least one luggage device 10 and at least one admin device 16.

It should be noted that communication between each of the computing system 14, at least one luggage device 10, at least one admin device 16, and database server 18 may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes. It should also be noted that the term "admin device" is intended to include any type of computing or electronic device now known or later developed, such as desktop computers, mobile phones, smartphones, laptop computers, tablet computers, personal data assistants, gaming devices, POS systems, access control devices, point of interaction ("POI") systems, the at least one luggage device 10, etc. Additionally, in at least one embodiment, the at least one luggage device 10 and at least one admin device 16 are one and the same.

With continued reference to FIG. 9, in the exemplary embodiment, each of the computing system 14, luggage device 10, and admin device 16 contains the hardware and software necessary to carry out the exemplary methods for analyzing, verifying and managing luggage L as described herein. Furthermore, in at least one embodiment, the computing system 14 comprises a plurality of computing devices selectively working in concert with one another to carry out the exemplary methods described herein. In at least one embodiment, each luggage device 10 provides a luggage application 120 residing in memory 122 on the computerized processing unit 40 of the luggage device 10, while each admin device 16 provides an admin application 124 residing in memory 126 on the admin device 16; the respective functionality of each of the luggage application 120 and admin application 124 described further below. It should be noted that the term "memory" is intended to include any type of electronic storage medium (or combination of storage mediums) now known or later developed, such as local hard drives, RAM, flash memory, external storage devices, network or cloud storage devices, etc. Furthermore, the various components of each luggage device 10 and admin device 16 may reside in memory on a single computing or electronic device, or may separately reside on two or more computing or electronic devices in communication with one another. In at least one embodiment, the admin device 16 is in the possession of an at least one person (herein referred to generally as an "admin user") associated with an entity that is desirous of interacting with the at least one luggage control device 10 for the purposes of analyzing, verifying and managing luggage L, as described further below—such entities potentially including but not limited to transportation companies (i.e., airlines, cruise lines, railroad companies, etc.) and their personnel, transportation authorities and their personnel, transportation hubs (i.e., airports, harbors, train stations, etc.) and their personnel, etc. It should be noted, depending on the context in which the system 12 is used, in various embodiments, each of the at least one luggage device 10 and at least one admin device 16 may include or omit any combination of the components described above.

In at least one embodiment, the luggage application 120 is configured for analyzing, verifying and managing luggage L as described above and further described below. Additionally, in at least one embodiment, the admin application 124 is password protected (to prevent tampering) and configured for receiving select data as gathered by the luggage application 120, and also for selectively configuring and managing the at least one luggage device 10 remotely, as described in detail below.

Figure 10:
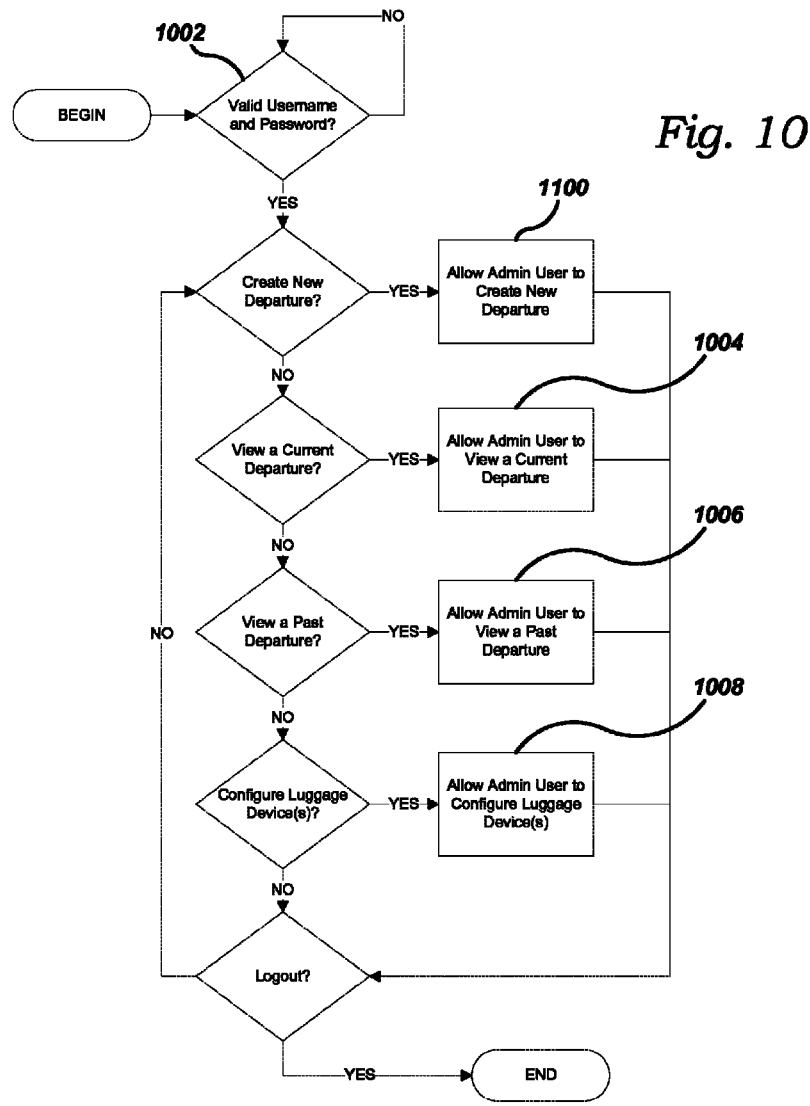
FIGS. 10 and 11 are flow diagrams of exemplary methods for analyzing, verifying and managing luggage, in accordance with at least one embodiment.

In at least one such embodiment, as illustrated in the flow diagram of FIG. 10, upon the admin user properly logging into the admin application 124 (1002) via the admin device 16 (using a previously registered username and password), the admin user is presented with a variety of options, including but not limited to creating a new departure—i.e., flight, train, boat, etc. —(1100), viewing real-time information related to current departures (1004), viewing reports related to past departures (1006), and configuring or calibrating the luggage device 10 (1008).

Figure 11:
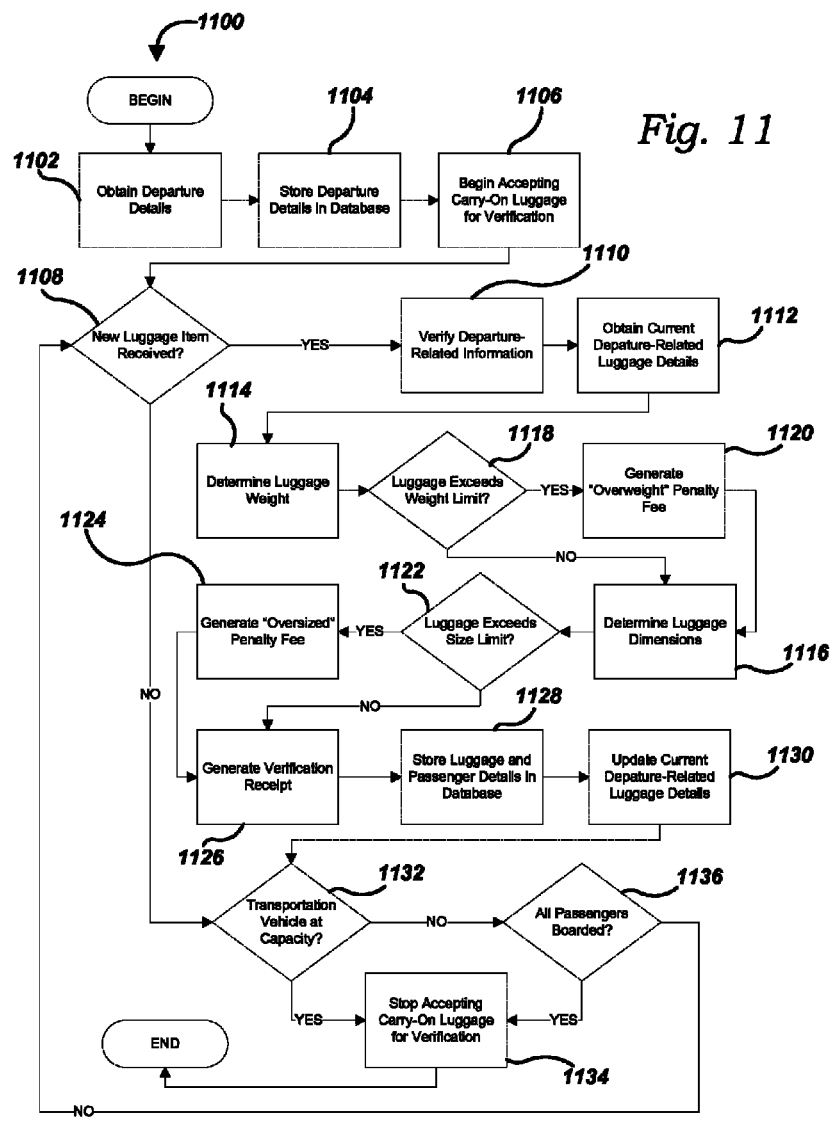

As illustrated in the flow diagram of FIG. 11, in at least one embodiment, upon the admin user desiring to create a new departure (1100), the admin user is first prompted to input certain details related to the departure (1102) such as a departure identification number (i.e., flight number, train number, etc.), departure location, destination, departure date, departure time, boarding gate, total number of passengers, type of transportation vehicle, etc. The specific types of details may vary from one embodiment to another, and are further dependent on the context in which the system 12 is implemented (i.e., air travel, rail travel, etc.). As such, the above list of details is merely exemplary. In at least one embodiment, the admin user is only required to input the departure identification number, departure date and boarding gate, as the admin application 124 is then able to access the further flight details through the database server 18 based on those inputs. Once the necessary details related to the departure have been input, the new departure is saved to the database server 18 (1104) and boarding of the departure is allowed to begin (1106), at which point passengers P may utilize the luggage device 10 to verify that their carry-on luggage L complies with the pre-defined weight and dimension limitations (1108)—which, in at least one embodiment, requires each passenger P to scan their boarding pass or otherwise input requested departure-related information (1110) so that the luggage device 10 may properly associate the luggage L with the appropriate departure, and also associate the luggage L with the passenger P. The luggage device 10 is also able to obtain from the database server 18 at least one of a pre-defined maximum luggage count, a current luggage count, a pre-defined maximum luggage weight, a current luggage weight, a pre-defined maximum storage volume, and currently occupied volume (1112) for better ensuring that the system 12 does not allow more luggage L to be boarded than is allowed or even physically possible. As discussed above, upon a piece of luggage L being inserted into the luggage device 10, the luggage device 10 determines the weight of the luggage L (1114) as well as its dimensions (1116). Upon determining that the luggage L exceeds the weight limitation (1118), the luggage device 10 generates an "overweight" penalty fee that the passenger P must pay (1120). Similarly, upon determining that the luggage item exceeds the dimension limitations (1122), the luggage device 10 generates an "oversized" penalty fee that the passenger P must pay (1124)—such payment(s) needing to be made through the luggage device 10, or before boarding the transportation vehicle, or at any point thereafter, depending on the embodiment and how the transportation company decides to handle such payment requirements. In at least one embodiment, the passenger P is not notified about incurring any such penalty fees until after boarding, so as to better prevent the passenger P from trying circumvent or otherwise delay the verification process. Alternatively, in at least one embodiment, if the luggage L exceeds one or both of the weight and dimension limitations, the luggage device 10 may reject the luggage L and require that it be checked rather than carried on. In a still further embodiment, the luggage device 10 may be configured for generating a penalty fee only where the luggage L falls within a certain "excess" range beyond the weight limitation and/or dimension limitation; but if the luggage L is too heavy and/or too large (i.e., falling outside of the pre-defined excess ranges for weight and/or dimensions), rather than generating an appropriate penalty fee, the luggage device 10 instead rejects the luggage L and requires that it be checked rather than carried on. Upon completion of all appropriate verifications of both the passenger P (e.g., identity as through the boarding pass, etc.) and any associated luggage L (size and weight), an appropriate receipt (or barcode sticker) is generated and dispensed by the luggage device 10 (1126) for the passenger P to present at the boarding gate—either by hand or by affixing it to the luggage L, depending on the embodiment and how the transportation company decides to handle such receipts.

The luggage device 10 then transmits to the database server 18 the details related to the analyzed luggage L (i.e., size, weight, photos, etc.) along with the associated passenger P and departure (1128) to be stored in a luggage registry on the database server 18. The luggage device 10 also communicates with the database server 18 to update and synchronize the total luggage count for the departure as well as the total luggage weight for the departure (1130). In at least one embodiment, given that the system 12 may incorporate more than one luggage device 10, rather than communicating with the database server 18 to update and synchronize the total luggage count and total luggage weight after each new luggage L is analyzed, each luggage device 10 instead may periodically communicate with the database server 18 at pre-defined time intervals (ex., every five minutes). Upon determining that the transportation vehicle is unable to accommodate any more carry-on luggage L (1132)—for example, if the luggage device 10 determines that the total luggage count has reached the pre-defined maximum luggage count, or that the total luggage weight has reached the pre-defined maximum luggage weight—the luggage device 10 ceases accepting new luggage L for the associated departure (1134), instead requiring passengers P to check any additional luggage L. This helps in avoiding lines and confusion at the boarding gate (and even inside of the transportation vehicle) that are often caused by confused passengers P who are trying to find room for their carry-on luggage L when no such room exists. Additionally, in at least one embodiment, upon determining that all passengers P have boarded (1136), the luggage device 10 ceases accepting new luggage L for the associated departure (1134). It should be noted that the order in which the above described steps are described is merely exemplary, such that the steps may be carried out in different orders in further embodiments.

In an alternate embodiment, rather than communicating with the database server 18 to update and synchronize the total luggage count for the departure, the luggage device 10 instead updates and synchronizes the currently occupied volume of luggage L, which is calculated based on the dimensions of each luggage L that is analyzed by the luggage device 10. Accordingly, based on the pre-defined maximum storage volume (i.e., the maximum volume provided by the transportation vehicle to accommodate carry-on luggage L), upon determining that the currently occupied volume of luggage L has reached the maximum storage volume, the luggage device 10 ceases accepting new luggage L for the associated departure, instead requiring passengers P to check any additional luggage L. Relatedly, while determining the dimensions of a luggage L (i.e., before the maximum storage volume has been met), if the luggage device 10 determines that the dimensions of the luggage L will cause the currently occupied volume to exceed the maximum storage volume, the luggage device 10 may reject the luggage L and require that it be checked.

In at least one embodiment, the luggage device 10 may be configured for applying a different set of rules for passengers P having a first class or business class boarding pass, thereby providing added benefits to such passengers P. For example, in one such embodiment, the luggage device 10 may employ relatively more relaxed dimension limitations and/or weight limitations, thereby allowing such passengers P to carry on relatively larger and/or heavier luggage L without incurring penalty fees. In another such embodiment, the luggage device 10 may allow a given first class or business class passenger P to carry on a relatively greater number of luggage L as compared to other passengers P.

As mentioned above, in at least one embodiment, each of the admin application 124 and luggage application 120 is configured for allowing the admin user to view real-time information related to current departures (1004), as well as reports related to past departures (1006). In a bit more detail, in at least one such embodiment, the admin user is capable of viewing information on the current boarding process, in real-time, for a specified departure—said information capable of including but not being limited to the total number of passengers P who have boarded, the percentage of total passengers P who have boarded relative to the total number of passengers P expected to board, the number of expected passengers P who have yet to board, the total number of carry-on luggage L that has been boarded, the percentage of carry-on luggage L that have been boarded relative to the maximum number of luggage L allowed, the number of carry-on luggage L that may still be boarded, the total weight of the carry-on luggage L that have been boarded, the percentage of the total weight of the carry-on luggage L relative to the maximum weight allowed, the currently occupied volume of carry-on luggage L in the transportation vehicle, the percentage of the currently occupied volume of carry-on luggage L relative to the maximum storage volume allotted, the volume of storage space still available, the number of carry-on luggage L that have been flagged as "overweight," the number of carry-on luggage L that have been flagged as "oversized," etc. Such real-time information can provide a number of benefits. For example, having real-time information regarding the total weight of the carry-on luggage L that have been boarded along with the percentage of total passengers P who have boarded relative to the total number of passengers P expected to board allows the admin user (or the computing system 14) to extrapolate that information in order to predict what the total weight will be once all passengers and carry-on luggage L have boarded, thereby allowing the necessary amount of fuel to be calculated and loaded ahead of time with relatively greater accuracy. Such information can also be useful when aggregating such data across multiple departures in order to identify various trends—i.e., which travel routes tend to have greatest number of carry-on luggage L, what is the average weight of carry-on luggage L per passenger P, which transportation hubs have the greatest number of oversized or overweight carry-on luggage L, etc. —and modify operations to better accommodate those trends.

EXAMPLES

The following non-limiting examples are provided for illustrative purposes only in order to facilitate a more complete understanding of the disclosed subject matter. These examples should not be construed to limit any of the embodiments described in the present specification, including those pertaining to a luggage control and verification device and/or methods and uses thereof.

Example 1

Airport Gate

This example demonstrates the use of a luggage control and verification system according to aspects of the present invention in the context of air travel, such as passengers with carry-on items preparing to board a plane at an airport gate or equivalent.

A passenger arrives at his gate at the Los Angeles International Airport approximately thirty-five (35) minutes prior to his flight, it being customary for passengers to arrive at a departure gate sometimes several minutes to an hour or more prior to a scheduled flight's departure, depending on their punctuality, how long it took them to come through security, or the layover time between flights, for example. Different airlines have different policies regarding carry-on items and how they are handled at the gate or point of boarding, in part depending on the type of aircraft. Signs are posted or audible announcements made at the gate regarding restrictions concerning carry-on items, with passengers being instructed to verify each of their carry-on items in the luggage control and verification device conveniently located at the gate. The passenger approaches the device and follows the prompts on the display indicating that his carry-on item, in this case a rolling suitcase measuring twenty-two inches tall by nine inches deep by fourteen inches wide (22" H×9" D×14" W) and weighing twenty-eight pounds (28 lbs) is to be placed into the machine's receptacle. The passenger further is prompted to scan his boarding pass in front of the machine's reader, which he does, enabling the system to link the passenger's carry-on bag with his boarding and itinerary information in the flight manifest previously stored in the system. The device then automatically weighs and scans the carry-on bag, determining it to have the size and weight noted above. Next, the device compares the actual bag measurements against the acceptable size and weight limits imposed by the airline, again based on both the airline's policies and procedures and the type of aircraft for the flight the passenger is to board. Accordingly, the device determines that while the carry-on bag is just within the airline's dimensional limitations, it is overweight by three pounds (3 lbs), the airline setting a maximum carry-on weight per bag of twenty-five pounds (25 lbs). The passenger is then prompted to pay a weight overage fee so as to validate the carry-on bag and allow the passenger to board with it, which the passenger is easily and conveniently able to do by following the prompts on the display, charging the fee to the same credit card that the passenger used to book his flight. The device then dispenses a verification receipt that the passenger is to present to the airline attendant when boarding so as to demonstrate that his carry-on luggage is "compliant," as having either met the size and weight restrictions or any overages paid for. The passenger then takes his seat to await boarding of his flight with still more than thirty (30) minutes to spare and without the inconvenience to the passenger of having to "gate check" his bag or to the airline of having to verify his and the other passengers' bags at the time of boarding.

Example 2

Airport Gate

This example again demonstrates the use of a luggage control and verification system according to aspects of the present invention in the context of air travel, here involving passengers with carry-on items in the process of boarding a plane at an airport gate or equivalent.

Passengers are invited to begin boarding their flight at a John F. Kennedy International Airport gate, group by group. As each group approaches the entrance to the jet bridge and the boarding checkpoint, signs and other instructions from agents inform the passengers that within the boarding zone the passengers are moving through are multiple stations for verification of their carry-on items (size and/or weight), for example one on the left and one on the right of the zone. As instructed, each passenger places their carry-on bag or other item in one of the stations and follows the prompts on the screen to have their bag verified. A receipt is immediately issued for each compliant bag, while any passenger with a non-compliant bag is presented with further instructions and payment options via the device's user interface, the completion of which also results in the issuance of a verification receipt. In this manner, each passenger boarding the flight moves through the boarding zone and then presents to the agent their boarding pass and luggage verification receipt for boarding, demonstrating both that they are properly ticketed for the flight and that their carry-on luggage is "compliant," as having either met the size and weight restrictions or any overages were paid for.

Example 3

Train Station

This example demonstrates the use of a luggage control and verification system according to aspects of the present invention in the context of rail travel, such as passengers with carry-on items preparing to board a train at a train station or equivalent.

A passenger arrives at the Paris Lyon Rail Station, or Gare de Lyon, with her Eurail France-Switzerland pass to catch a train to Geneva. She has two large bags, each being smaller than eighty-five centimeters (85 cm) in any one dimension and one weighing thirteen kilograms (13 kg) and the other eleven kilograms (11 kg). In the station's ticketing concourse and main lobby there are luggage control and verification devices positioned with signage indicating that all bags to be boarded on the train must be verified. She approaches one of the machines and scans her Eurail pass as prompted, which then links to and pulls up her pass validation and personal information to be linked with her baggage. Following the prompts, she then places one of her bags in the machine's receptacle for size and weight measurement and then the other. The machine also photographs each bag while in the receptacle for identification, which photos are made part of the passenger's record. Accessing the train operator's baggage policy, here Eurostar, the machine determines that while each of the bags are dimensionally below the maximum allowed size and each is individually beneath the weight allotment of twenty kilograms (20 kg), the total weight of the two bags is determined to be twenty-four kilograms (24 kg), putting her combined baggage weight over the allowed amount by four kilograms (4 kg). The display then prompts her to make an election between re-weighing, as might be the case if she chose to remove some items and discard them or store them in a train station locker, or paying an excess weight fee. She chooses to pay the fee, inserting the appropriate number of Euro bills into the machine's bill slot and receiving a verification receipt that her bags are "compliant" or approved for boarding. She then proceeds to the gate where she presents her Eurail pass and her luggage verification receipt to gain admission to the platform for subsequent train boarding.

Thus, there is provided a luggage control and verification system according to aspects of the present invention wherein both dimensions verification and weight verification may be accomplished in the same integrated apparatus and process. The verification system and method is flexible enough to be adapted to the needs of every transportation company. The system is capable in some embodiments of including in the process the necessary communication with external fare charge systems in order to integrate them with the results of the luggage verification, keeping the passenger informed of any additional fares required due to luggage non-compliance through a visual interface configured in the exemplary embodiment as a touchscreen. Upon completion of the verification process the device will generate a ticket/receipt for the passenger informing the passenger about the compliance of his luggage and the additional fees applied in any case in which there was a charge due to luggage non-compliance.

Aspects of the present specification may also be described as follows:

1. A luggage control and verification system for controlling and verifying the size and weight of an at least one piece of carry-on luggage, the system comprising: an at least one database server configured for selectively storing data related to at least one of said luggage, an at least one passenger in possession of said luggage, a transportation vehicle on which said passenger plans to travel, and a transportation hub from which said transportation vehicle is to depart; an at least one luggage device in selective communication with the at least one database server and comprising: a receptacle configured for removable receipt of the luggage, the receptacle formed having a bottom, a back wall, and an at least one side wall; and at least one verification device integral with the receptacle for determination of at least one of a height, depth, width, weight, and identification information associated with the luggage; and wherein, upon the creation of a new departure involving said transportation vehicle, said luggage device is configured for: obtaining select information related to said departure, said information including at least one of a maximum luggage weight for the transportation vehicle, a current luggage weight, a maximum luggage size for the transportation vehicle, a maximum luggage count for the transportation vehicle, a current luggage count, a maximum storage volume for the transportation vehicle, and a currently occupied volume; and upon said passenger utilizing said luggage device to verify the size and weight of said luggage: receiving said luggage within the receptacle of said luggage device; determining the weight of said luggage; upon determining that the weight of said luggage is greater than the maximum luggage weight, generating an overweight penalty fee that said passenger must pay; determining at least one of the height, depth, and width of said luggage; and upon determining that at least one of the height, depth, and width of said luggage is greater than the maximum luggage size, generating an oversized penalty fee that said passenger must pay.

2. The system according to embodiment 1, wherein the luggage device further comprises: a processing unit in communication with the at least one verification device and storing data regarding required specifications for the luggage relative to one or more of the height, depth, width, weight, and identification information; and a user interface comprising an interactive display device in communication with the processing unit, whereby a passenger is presented with verification information concerning the luggage as determined by the at least one verification device and processed by the processing unit.

3. The system according to embodiments 1-2, wherein the least one luggage device provides a luggage application residing in memory on said luggage device, the luggage application configured for obtaining and processing data related to at least one of the height, depth, width, weight, and identification information associated with the luggage.

4. The system according to embodiments 1-3, further comprising an at least one admin device in selective communication with at least one of the at least one luggage device and database server, the admin device configured for remotely communicating with and receiving data from said luggage device.

5. The system according to embodiments 1-4, wherein the at least one admin device provides an admin application residing in memory on said admin device, the admin application configured for remotely communicating with and receiving data from the luggage application of the at least one luggage device.

6. The system according to embodiments 1-5, further comprising a central computing system in selective communication with the at least one luggage device, admin device and database server, the computing system configured for facilitating the transmission of data between said luggage device, admin device and database server.

7. The system according to embodiments 1-6, wherein the at least one verification device comprises an at least one sensor installed within at least one of the side wall and the bottom, the at least one sensor configured for obtaining dimensional measurements associated with the luggage placed within the receptacle.

8. The system according to embodiments 1-7, wherein a first sensor track is installed within the side wall and configured for determining at least one of the height and depth of the luggage.

9. The system according to embodiments 1-8, wherein a second sensor track is installed within the side wall offset from the first sensor track and configured for determining at least one of the height and depth of the luggage, whereby the first and second sensor tracks operate in tandem to determine a dimensional range of the luggage.

10. The system according to embodiments 1-9, wherein the first and second sensor tracks are each formed in an inverted L-shaped arrangement.

11. The system according to embodiments 1-10, wherein a third sensor track is installed within the bottom and configured for determining the width of the luggage.

12. The system according to embodiments 1-11, wherein the first, second and third sensor tracks are each configured as an array of sensors.

13. The system according to embodiments 1-12, wherein the first, second and third sensor tracks are each configured as a single sensor selectively movable along the respective track.

14. The system according to embodiments 1-13, wherein the at least one verification device further comprises a scale for determining the weight of the luggage.

15. The system according to embodiments 1-14, wherein the scale is installed within the bottom of the receptacle on which the luggage directly is placed.

16. The system according to embodiments 1-15, wherein: the receptacle is installed on a frame; and the frame is positioned on the scale, whereby the scale is configured in cooperation with the processing unit to not account for the weight of the receptacle and support frame in determining the weight of the luggage.

17. The system according to embodiments 1-16, wherein: the receptacle is further formed having a top; and the at least one verification device further comprises a camera installed in the top and configured for obtaining visual data associated with identification information relating to the luggage.

18. The system according to embodiments 1-17, wherein the camera is further configured for determining dimensional measurements associated with the luggage placed within the receptacle.

19. The system according to embodiments 1-18, wherein the camera lens is configured for determining in conjunction with the processing unit the width and depth of the luggage.

20. The system according to embodiments 1-19, wherein the camera focal length is configured for determining in conjunction with the processing unit the height of the luggage.

21. The system according to embodiments 1-20, wherein the receptacle is pitched rearwardly, whereby the luggage placed within the receptacle will rest against the back wall of the receptacle.

22. The system according to embodiments 1-21, wherein the processing unit further comprises a transceiver for wireless communication to and from the processing unit, whereby the required specifications may be wirelessly sent to the processing unit and the verification information may be wirelessly sent from the processing unit.

23. The system according to embodiments 1-22, wherein the display device comprises a touchscreen.

24. The system according to embodiments 1-23, wherein the luggage device further comprises a scanner, whereby identifying information of the passenger may be scanned.

25. The system according to embodiments 1-24, wherein the luggage device further comprises an at least one printer, whereby at least one of verification information and identifying information of the luggage may be printed and dispensed to the passenger.

26. The system according to embodiments 1-25, wherein the luggage device further comprises a payment device, whereby payment may be received from the passenger.

27. The system according to embodiments 1-26, wherein the payment device is selected from the group consisting of a card reader, a bill slot, and a coin slot.

28. The system according to embodiments 1-27, wherein the luggage device further comprises a housing containing the receptacle, the at least one verification device, the processing unit, and the user interface.

29. The system according to embodiments 1-28, wherein the housing is formed having wheels and a handle for transport of the luggage device.

30. The system according to embodiments 1-29, further comprising an external scale in communication with the at least one luggage device, whereby the weight of the passenger may be determined.

31. The system according to embodiments 1-30, further comprising an intermediate control unit electrically connected between the at least one verification device and the processing unit.

32. The system according to embodiments 1-31, wherein, upon the creation of said new departure involving said transportation vehicle, said luggage device is further configured for: storing in the database server said information related to said departure; and beginning the acceptance of carry-on luggage for verification.

33. The system according to embodiments 1-32, wherein said luggage device is further configured for stopping the acceptance of carry-on luggage for verification in connection with said new departure upon determining at least one of the current luggage count being equal to the maximum luggage count, the current luggage weight being equal to the maximum luggage weight, the currently occupied volume being equal to the maximum storage volume, and all of said passengers having boarded said transportation vehicle.

34. The system according to embodiments 1-33, wherein, upon said passenger utilizing said luggage device to verify the size and weight of said luggage, said luggage device is further configured for: scanning a boarding pass in the possession of said passenger; generating a verification receipt for said passenger; updating at least one of the current luggage count, the current luggage weight, and the currently occupied volume; and storing in the database server information obtained related to said luggage and said passenger.

35. The system according to embodiments 1-34, wherein said luggage device is further configured for rejecting said luggage and requiring said luggage to be checked rather than carried on upon determining that at least one of the height, depth, and width of said luggage will cause the currently occupied volume to exceed the maximum storage volume.

36. A luggage control and verification system for controlling and verifying the size and weight of an at least one piece of carry-on luggage, the system comprising: an at least one luggage device comprising: a receptacle configured for removable receipt of said luggage, the receptacle pitched rearwardly and formed having a bottom, a back wall, and an at least one side wall; a first sensor track installed within the side wall of the receptacle and configured for determining at least one of a height and depth of said luggage; a second sensor track installed within the side wall of the receptacle, offset from the first sensor track, and configured for determining at least one of the height and depth of said luggage, wherein the first and second sensor tracks are each formed in an inverted L-shaped arrangement and operate in tandem to determine a dimensional range of said luggage; a third sensor track installed within the bottom of the receptacle and configured for determining a width of said luggage; and a scale installed within the bottom of the receptacle, on which said luggage is directly placed, for determining the weight of said luggage.

37. A luggage control and verification system for controlling and verifying the size and weight of an at least one piece of carry-on luggage, the system comprising: an at least one database server configured for selectively storing data related to at least one of said luggage, an at least one passenger in possession of said luggage, a transportation vehicle on which said passenger plans to travel, and a transportation hub from which said transportation vehicle is to depart; an at least one luggage device in selective communication with the at least one database server and comprising: a receptacle configured for removable receipt of said luggage, the receptacle pitched rearwardly and formed having a bottom, a back wall, and an at least one side wall; a first sensor track installed within the side wall of the receptacle and configured for determining at least one of a height and depth of said luggage; a second sensor track installed within the side wall of the receptacle, offset from the first sensor track, and configured for determining at least one of the height and depth of said luggage, wherein the first and second sensor tracks are each formed in an inverted L-shaped arrangement and operate in tandem to determine a dimensional range of said luggage; a third sensor track installed within the bottom of the receptacle and configured for determining a width of said luggage; and a scale installed within the bottom of the receptacle, on which said luggage is directly placed, for determining the weight of said luggage; and wherein, upon the creation of a new departure involving said transportation vehicle, said luggage device is configured for: obtaining select information related to said departure, said information including at least one of a maximum luggage weight for the transportation vehicle, a current luggage weight, a maximum luggage size for the transportation vehicle, a maximum luggage count for the transportation vehicle, a current luggage count, a maximum storage volume for the transportation vehicle, and a currently occupied volume; and upon said passenger utilizing said luggage device to verify the size and weight of said luggage: receiving said luggage within the receptacle of said luggage device; determining the weight of said luggage; upon determining that the weight of said luggage is greater than the maximum luggage weight, generating an overweight penalty fee that said passenger must pay; determining at least one of the height, depth, and width of said luggage; and upon determining that at least one of the height, depth, and width of said luggage is greater than the maximum luggage size, generating an oversized penalty fee that said passenger must pay.

In closing, regarding the exemplary embodiments of the present invention as shown and described herein, it will be appreciated that a luggage control and verification system, along with associated methods of use, is disclosed. Because the principles of the invention may be practiced in a number of configurations beyond those shown and described, it is to be understood that the invention is not in any way limited by the exemplary embodiments, but is generally directed to a luggage control and verification system, along with associated methods of use, and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention. Furthermore, the various features of each of the above-described embodiments may be combined in any logical manner and are intended to be included within the scope of the present invention.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the present invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the present invention so claimed are inherently or expressly described and enabled herein.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A luggage control and verification system for controlling and verifying the size and weight of an at least one piece of carry-on luggage, the system comprising:
   an at least one database server configured for selectively storing data related to at least one of said luggage, an at least one passenger in possession of said luggage, a transportation vehicle on which said passenger plans to travel, and a transportation hub from which said transportation vehicle is to depart;
   an at least one luggage device in selective communication with the at least one database server and comprising:
      a receptacle configured for removable receipt of said luggage, the receptacle formed having a bottom, a back wall, and an at least one side wall; and
      an at least one verification device integral with the receptacle for determination of at least one of a height, depth, width, weight, and identification information associated with said luggage;
      the at least one verification device including a camera; and
   wherein, upon the creation of a new departure involving said transportation vehicle, said luggage device is configured for:
      obtaining select information related to said departure, said information including at least one of a maximum luggage weight for the transportation vehicle, a current luggage weight, a maximum luggage size for the transportation vehicle, a maximum luggage count for the transportation vehicle, a current luggage count, a maximum storage volume for the transportation vehicle, and a currently occupied volume; and upon said passenger utilizing said luggage device to verify the size and weight of said luggage:
receiving said luggage within the receptacle of said luggage device;
determining the weight of said luggage;
upon determining that the weight of said luggage is greater than the maximum luggage weight, generating an overweight penalty fee that said passenger must pay;
determining at least one of the height, depth, and width of said luggage; and
upon determining that at least one of the height, depth, and width of said luggage is greater than the maximum luggage size, generating an oversized penalty fee that said passenger must pay.

2. The system of claim 1, further comprising an at least one admin device in selective communication with at least one of the at least one luggage device and database server, the admin device configured for remotely communicating with and receiving data from said luggage device.

3. The system of claim 1, wherein the at least one verification device comprises:
a first sensor track installed within the side wall of the receptacle and configured for determining at least one of a height and depth of said luggage; and
a second sensor track installed within the side wall of the receptacle, offset from the first sensor track, and configured for determining at least one of the height and depth of said luggage, wherein the first and second sensor tracks are each formed in an inverted L-shaped arrangement and operate in tandem to determine a dimensional range of said luggage.

4. The system of claim 3, wherein a third sensor track is installed within the bottom and configured for determining the width of the luggage.

5. The system of claim 4, wherein the first, second and third sensor tracks are each configured as an array of sensors.

6. The system of claim 4, wherein the first, second and third sensor tracks are each configured as a single sensor selectively movable along the respective track.

7. The system of claim 1, wherein the at least one verification device further comprises a scale for determining the weight of the luggage.

8. The system of claim 7, wherein the scale is installed within the bottom of the receptacle on which the luggage directly is placed.

9. The system of claim 1, wherein:
the receptacle is further formed having a top; and
the camera is installed in the top of the receptacle.

10. The system of claim 1, wherein the receptacle is pitched rearwardly, whereby the luggage placed within the receptacle will rest against the back wall of the receptacle.

11. The system of claim 1, wherein the luggage device further comprises a scanner, whereby identifying information of the passenger may be scanned.

12. The system of claim 1, wherein the luggage device further comprises an at least one printer, whereby at least one of verification information and identifying information of the luggage may be printed and dispensed to the passenger.

13. The system of claim 1, further comprising an external scale in communication with the at least one luggage device, whereby the weight of the passenger may be determined.

14. The system of claim 1, wherein, upon the creation of said new departure involving said transportation vehicle, said luggage device is further configured for:
storing in the database server said information related to said departure; and
beginning the acceptance of carry-on luggage for verification.

15. The system of claim 14, wherein said luggage device is further configured for stopping the acceptance of carry-on luggage for verification in connection with said new departure upon determining at least one of the current luggage count being equal to the maximum luggage count, the current luggage weight being equal to the maximum luggage weight, the currently occupied volume being equal to the maximum storage volume, and all of said passengers having boarded said transportation vehicle.

16. The system of claim 1, wherein, upon said passenger utilizing said luggage device to verify the size and weight of said luggage, said luggage device is further configured for:
scanning a boarding pass in the possession of said passenger;
generating a verification receipt for said passenger;
updating at least one of the current luggage count, the current luggage weight, and the currently occupied volume; and
storing in the database server information obtained related to said luggage and said passenger.

17. The system of claim 16, wherein said luggage device is further configured for rejecting said luggage and requiring said luggage to be checked rather than carried on upon determining that at least one of the height, depth, and width of said luggage will cause the currently occupied volume to exceed the maximum storage volume.

18. A luggage control and verification system for controlling and verifying the size and weight of an at least one piece of carry-on luggage associated with a passenger of a transportation vehicle, the system comprising:
an at least one luggage device comprising:
a receptacle configured for removable receipt of said luggage, the receptacle formed having a bottom, a back wall, and an at least one side wall;
a first sensor track installed within the side wall of the receptacle and configured for determining at least one of a height and depth of said luggage;
a second sensor track installed within the side wall of the receptacle, offset from the first sensor track, and configured for determining at least one of the height and depth of said luggage, wherein the first and second sensor tracks are each formed in an inverted L-shaped arrangement and operate in tandem to determine a dimensional range of said luggage;
a third sensor track installed within the bottom of the receptacle and configured for determining a width of said luggage; and
a scale installed within the bottom of the receptacle, on which said luggage is directly placed, for determining the weight of said luggage;
wherein, upon the creation of a new departure involving said transportation vehicle, said luggage device is configured for:
obtaining select information related to said departure, said information including at least one of a maximum luggage weight for the transportation vehicle, a current luggage weight, a maximum luggage size for the transportation vehicle, a maximum luggage count for the transportation vehicle, a current luggage count, a maximum storage volume for the transportation vehicle, and a currently occupied volume; and upon said passenger utilizing said luggage device to verify the size and weight of said luggage:
receiving said luggage within the receptacle of said luggage device;
determining the weight of said luggage;
upon determining that the weight of said luggage is greater than the maximum luggage weight, generating an overweight penalty fee that said passenger must pay;
determining at least one of the height, depth, and width of said luggage; and
upon determining that at least one of the height, depth, and width of said luggage is greater than the maximum luggage size, generating an oversized penalty fee that said passenger must pay.

19. A luggage control and verification system for controlling and verifying the size and weight of an at least one piece of carry-on luggage, the system comprising:

an at least one database server configured for selectively storing data related to at least one of said luggage, an at least one passenger in possession of said luggage, a transportation vehicle on which said passenger plans to travel, and a transportation hub from which said transportation vehicle is to depart;

an at least one luggage device in selective communication with the at least one database server and comprising:
a receptacle configured for removable receipt of said luggage, the receptacle pitched rearwardly and formed having a bottom, a back wall, and an at least one side wall;
a first sensor track installed within the side wall of the receptacle and configured for determining at least one of a height and depth of said luggage;
a second sensor track installed within the side wall of the receptacle, offset from the first sensor track, and configured for determining at least one of the height and depth of said luggage, wherein the first and second sensor tracks are each formed in an inverted L-shaped arrangement and operate in tandem to determine a dimensional range of said luggage;
a third sensor track installed within the bottom of the receptacle and configured for determining a width of said luggage; and
a scale installed within the bottom of the receptacle, on which said luggage is directly placed, for determining the weight of said luggage; and wherein, upon the creation of a new departure involving said transportation vehicle, said luggage device is configured for:
obtaining select information related to said departure, said information including at least one of a maximum luggage weight for the transportation vehicle, a current luggage weight, a maximum luggage size for the transportation vehicle, a maximum luggage count for the transportation vehicle, a current luggage count, a maximum storage volume for the transportation vehicle, and a currently occupied volume; and upon said passenger utilizing said luggage device to verify the size and weight of said luggage:
receiving said luggage within the receptacle of said luggage device;
determining the weight of said luggage;
upon determining that the weight of said luggage is greater than the maximum luggage weight, generating an overweight penalty fee that said passenger must pay;
determining at least one of the height, depth, and width of said luggage; and
upon determining that at least one of the height, depth, and width of said luggage is greater than the maximum luggage size, generating an oversized penalty fee that said passenger must pay.

* * * * *